(12) United States Patent
Peterson

(10) Patent No.: US 10,685,459 B2
(45) Date of Patent: Jun. 16, 2020

(54) GENERATING ENHANCED DIGITAL IMAGES BY SELECTIVELY TRANSFORMING RASTER IMAGES TO VECTOR DRAWING SEGMENTS

(71) Applicant: Adobe Inc., San Jose, CA (US)

(72) Inventor: John Peterson, Menlo Park, CA (US)

(73) Assignee: ADOBE INC., San Jose, CA (US)

( * ) Notice: Subject to any disclaimer, the term of this patent is extended or adjusted under 35 U.S.C. 154(b) by 24 days.

(21) Appl. No.: 15/996,115

(22) Filed: Jun. 1, 2018

(65) Prior Publication Data

US 2019/0371008 A1 Dec. 5, 2019

(51) Int. Cl.
| | | |
|---|---|---|
| G06K 9/36 | (2006.01) | |
| G06K 9/46 | (2006.01) | |
| G06T 9/20 | (2006.01) | |
| G06T 11/20 | (2006.01) | |
| G06T 7/13 | (2017.01) | |

(52) U.S. Cl.
CPC .................. *G06T 9/20* (2013.01); *G06T 7/13* (2017.01); *G06T 11/203* (2013.01); *G06T 2200/24* (2013.01)

(58) Field of Classification Search
CPC ......... G06T 11/203; G06T 5/003; G06T 7/13; G06K 9/00637; G06K 9/4623
USPC ........ 382/232, 190, 199, 276, 278; 345/629, 345/16, 421, 637; 700/17, 83; 348/181, 348/E17.001
See application file for complete search history.

(56) References Cited

U.S. PATENT DOCUMENTS

| | | | |
|---|---|---|---|
| 4,882,683 A | 11/1989 | Rupp et al. | |
| 5,101,436 A | 3/1992 | Deaguiar et al. | |
| 5,381,521 A | 1/1995 | Ballard | |
| 5,644,406 A | 7/1997 | Harrington et al. | |
| 6,683,984 B1 * | 1/2004 | Simske | H04N 1/38 382/190 |
| 6,891,536 B2 * | 5/2005 | Smith | G06T 1/20 345/421 |
| 7,242,415 B1 * | 7/2007 | Yhann | G06T 11/40 345/629 |
| 7,253,792 B2 * | 8/2007 | Biagiotti | H04N 17/00 345/16 |

(Continued)

OTHER PUBLICATIONS

Combined Search and Examination Report as received in United Kingdom Application GB1903498.2 dated Sep. 12, 2019.

(Continued)

*Primary Examiner* — Charlotte M Baker
(74) *Attorney, Agent, or Firm* — Keller Jolley Preece

(57) ABSTRACT

The present disclosure describes one or more embodiments of a selective raster image transformation system that quickly and efficiently generates enhanced digital images by selectively transforming edges in raster images to vector drawing segments. In particular, the selective raster image transformation system efficiently utilizes a content-aware, selective approach to identify, display, and transform selected edges of a raster image to a vector drawing segment based on sparse user interactions. In addition, the selective raster image transformation system employs a prioritized pixel line stepping algorithm to generate and provide pixel lines for selective edges of a raster image in real time, even on portable client devices.

20 Claims, 20 Drawing Sheets

(56) References Cited

U.S. PATENT DOCUMENTS

| | | | |
|---|---|---|---|
| 7,680,546 B2* | 3/2010 | Gilbert | G06Q 10/06 |
| | | | 700/17 |
| 8,116,568 B2 | 2/2012 | Daidoh | |
| 8,446,413 B2 | 5/2013 | Anderson | |
| 9,286,021 B2* | 3/2016 | Appleton | G06F 3/14 |
| 10,325,386 B2* | 6/2019 | Mankovskii | G06T 11/206 |
| 2014/0193029 A1 | 7/2014 | Vassilieva | |
| 2016/0085831 A1 | 3/2016 | Chao et al. | |
| 2017/0372455 A1 | 12/2017 | Winnemoeller et al. | |
| 2019/0371009 A1 | 12/2019 | Peterson | |

OTHER PUBLICATIONS

U.S. Appl. No. 15/996,131, Nov. 27, 2019, Notice of Allowance.
U.S. Appl. No. 15/996,131, Jan. 30, 2020, Notice of Allowance.

* cited by examiner

GENERATING ENHANCED DIGITAL IMAGES BY SELECTIVELY TRANSFORMING RASTER IMAGES TO VECTOR DRAWING SEGMENTS

BACKGROUND

In recent years, developers have generated a variety of hardware and software platforms for creating digital drawings. Indeed, utilizing these platforms, computing systems can now create, edit, save, and share vector drawings, such as drawings that include Bézier curves. Unlike raster images (e.g., images made up of pixels), vector drawings are scalable to any size without creating blurring or artifacts and, in many cases, are stored more compactly than raster images. However, despite the advantages of vector drawings, many electronic devices such as digital cameras and scanners still produce raster images. For example, most digital images found online today are created and stored as raster images.

Because of the advantages of vector drawings over raster images, individuals often desire to convert raster images into vector drawings. To convert a raster image, conventional image conversion systems generally offer two options. First, conventional systems track a plurality of user interactions of manually tracing the raster image with vector curves to convert the raster image to a vector drawing. Alternatively, conventional systems employ a batch conversion process that converts the entire raster image to a vector drawing. As discussed below, each of these options includes numerous disadvantages and shortcomings.

Regarding digital tracing of a raster image, conventional systems are inaccurate and inefficient. For example, conventional systems require users to manually trace the edge of a raster image by meticulously maneuvering a cursor precisely over the edge desired to be traced. Accordingly, the process of a user manually tracing the edge in a raster image is a tedious and time-consuming process and often results in a user tracing and re-tracing an edge until an accurate line tracing results.

In addition to being extremely burdensome to a user, conventional systems using digital tracing require considerable processing power and time to convert the raster image to a vector drawing. For instance, manually tracing pixels with a digital tool requires tracking numerous user interactions over a long period of time (in addition to significant training and experience by the user) to achieve adequate results. Indeed, because conventional systems require tracing of pixels, considerable time is needed to convert the raster image to a vector drawing. Further, even when using the assistance of digital tools, such as a snapping pen tool, tracing entire edges often produces unsatisfactory results. Indeed, conventional systems often generate vector drawings of non-optimal fit because they consider small incremental pieces of the edge rather than the whole edge at once. For instance, these assistive tools often miss endpoints, corners, and sharp turns of edges in the raster image, which result in poorly fitted curves. Overall, digital tracing produces poor results and causes inefficiencies to both computing resources and associated users.

The batch conversion process also produces inaccurate results and computing inefficiencies. For instance, the batch conversion processes a raster image by rigidly converting all edges found in the image into parametric curves (e.g., Bézier curves). After batch processing, conventional systems require significant user input, wasting significant time to delete undesirable and additional curves while fixing inaccuracies caused by the batch conversion process (e.g., incorrectly connected edges or inaccurate parametric curves). This "weeding out" process increases time for generating raster images as users find and fix unnecessary or erroneous parametric curves.

Moreover, converting all edges in the raster image causes computing devices to waste unnecessary processing power and memory resources. For instance, conventional image conversion systems waste needless processing resources converting edges from the raster image into vectors often for an individual to then remove many of the vectors and correct other vectors. Furthermore, during the conversion process, conventional systems often require a computing device to store generated conversion data, which requires additional storage space. Indeed, computing devices generate and store conversion data for many of the vectors that the individual then removes or changes, which wastes computer memory and storage resources.

As a further drawback, conventional image conversion systems employ complex processes to convert a raster image into a vector drawing. Often, because of the complexity, an individual must wait for the conversion to occur. Furthermore, due to the complexities and storage constraints mentioned above, many portable computing devices are incapable of converting an entire raster image (high-resolution raster images, in particular) to a vector drawing.

These along with additional problems and issues exist with conventional image conversion systems.

SUMMARY

One or more embodiments of the present disclosure provide benefits and/or solve one or more of the preceding (or other problems) in the art, with systems, computer-readable media, and methods that efficiently generate enhanced digital images by transforming raster elements in raster images to vector drawing segments. For example, in various embodiments the disclosed systems selectively identify, display, and transform individual edges of a raster image into vector drawing segments based on a sparse number of user interactions. Further, the disclosed systems can employ a pixel line stepping algorithm to identify and provide pixel lines for selective edges of a raster image in real-time, even on portable client devices.

To illustrate, in one or more embodiments, the disclosed systems generate an edge map for a raster image that includes a raster element (e.g., a physical object or item portrayed in a raster image, such as a foreground or background element). Based on a first user interaction with the raster element displayed in the raster image within a graphical user interface, the disclosed systems generate a pixel line (i.e., a set of pixels generated by stepping along pixels of an edge detected in the edge map) when a corresponding edge within the edge map is detected. In addition, the disclosed systems overlay the pixel line generated from the edge within the edge map to the user over the raster image. Upon detecting a second user interaction of selecting a pixel line within the graphical user interface, the disclosed systems fit a vector drawing segment (i.e., a parametric curve such as a Bezier curve) to the pixel line and displays the fitted vector drawing segment within the graphical user interface. Similarly, the disclosed systems selectively transform additional edges of the raster image into vector drawing segments based on detected user interactions.

As mentioned above, in various embodiments, the disclosed systems can generate a pixel line based on the first user interaction with the raster image within the graphical user interface and the pixel map. For instance, in one or more embodiments, the disclosed systems use the first user interaction to map to a pixel in the edge map that is part of a first edge. Starting at the pixel, the disclosed systems can step to connecting pixels along the first edge, in one or more directions, until a line termination condition is satisfied. In some embodiments, the disclosed systems prioritize adjacent pixels to diagonal pixels as part of a stepping algorithm. When a line termination condition is satisfied, the disclosed systems uses coordinates of the corresponding pixel and each of the additional connected pixels to form the pixel line. As mentioned above, this is displayed to the user within the graphical user interface. By selectively and efficiently generating pixel lines the disclosed systems render individual pixel lines for display in real-time.

The following description sets forth additional features and advantages of one or more embodiments of the disclosed systems and methods. In some cases, such features and advantages are obvious to a skilled artisan from the description or learned by the practice of the disclosed embodiments.

BRIEF DESCRIPTION OF THE DRAWINGS

The detailed description describes one or more embodiments with additional specificity and detail through the use of the accompanying drawings, as briefly described below.

DETAILED DESCRIPTION

Figure 1:
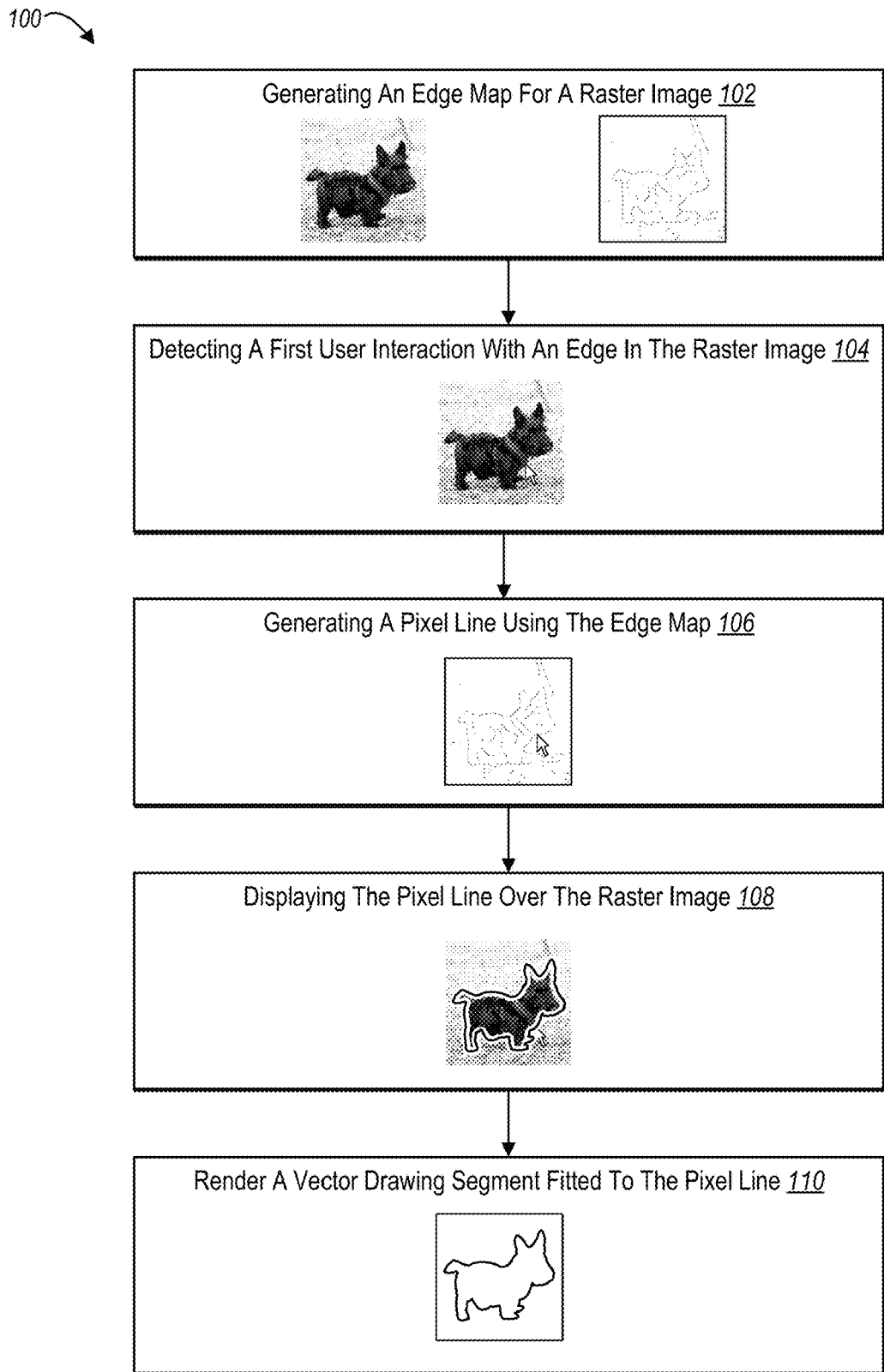
FIG. 1 illustrates generating a vector drawing from a raster image in accordance with one or more embodiments.

This disclosure describes one or more embodiments of a selective raster image transformation system that quickly and efficiently generates enhanced digital images by transforming user-selected raster elements displayed in raster images to vector drawing segments. For instance, the selective raster image transformation system (or simply "image transformation system") detects individual edges in a raster image based on user interaction and separately transforms user-selected edges into a vector drawing segment. Unlike conventional systems, the image transformation system eliminates wasteful batch processing operations and unnecessary conversion data storage by efficiently and selectively transforming edges of a raster element (e.g., foreground object) shown in a raster image to a vector drawing. Further, the image transformation system advantageously reduces the overall number of user interactions required to produce such a vector drawing.

To illustrate, in various embodiments the image transformation system generates enhanced digital images by transforming raster elements in raster images to vector drawing segments. In one or more embodiments, the image transformation system generates an edge map by detecting edges of a raster element displayed in a raster image (e.g., an object that a user wants to convert to vector form). Based on user interaction with an edge of the raster element, the image transformation system identifies a corresponding detected edge within the edge map. In response to the user interaction, the image transformation system generates a pixel line (i.e., a line of pixels generated by tracing pixels along an edge detected in the edge map) corresponding to the detected edge and displays the pixel line in the graphical user interface. In addition, the image transformation system detects an additional user interaction in the graphical user interface indicating a selection of the pixel line. In response, the image transformation system fits a vector drawing (e.g., lines and Bézier curves) to the pixel line and displays the vector drawing segment within the graphical user interface.

In some embodiments, the image transformation system identifies the detected edge in the edge map based on mapping the user interaction in the graphical user interface to the edge map. For example, the image transformation system determines raster image coordinates from the user interaction in the graphical user interface and maps the coordinates to the edge map to identify the detected edge within the edge map. Further, the image transformation system identifies a pixel along the detected edge from which to begin generating the pixel line.

As mentioned above, in some embodiments, when a user interacts with an edge in a raster image (e.g., by hovering a cursor over the edge), the image transformation system generates a pixel line and shows the pixel line over the raster image in the graphical user interface (to assist the user in selectively generating a vector drawing segment). In one or more embodiments, the image transformation system renders the pixel line over an edge of the raster element (e.g., edge of an item portrayed in the image) to which the pixel line corresponds. In addition, in various embodiments, the image transformation system highlights or otherwise emphasize the pixel line so it stands out to the user. Thus, as a user interacts with different edges in the raster image (e.g., moves around a cursor), the image transformation system displays different individual pixel lines corresponding to current user interaction.

As also mentioned above, in various embodiments, the image transformation system fits a vector drawing segment to the pixel line and display the vector drawing segment within the graphical user interface. In one or more embodiments, the image transformation system delays fitting the vector drawing segment until after additional user interaction is detected (e.g., selecting of a pixel line) in the graphical user interface. In this manner, only edges (or portions of edges) selected by the user are transformed into vector drawing segments, enabling a user to quickly transform desirable edges of a raster image into a vector drawing based on a small number of user interactions.

Once the image transformation system renders a first vector drawing segment, in one or more embodiments, the image transformation system enables the user to add additional vector drawing segments. For example, while displaying the first vector drawing segment, the image transformation system generates and displays a second pixel line within the graphical user interface based on a subsequent user interaction with a second edge of the raster element (e.g., edge of a foreground or background object). In some embodiments, if the user selects the second pixel line, the image transformation system generates a second vector drawing segment by vectorizing the second pixel line. In additional embodiments, the image transformation system connects the first vector drawing segment and the second vector drawing segment inline to form a contiguous vector drawing segment. In this manner, the image transformation system enables a user to easily and rapidly connect multiple continuous edges together to generate an enhanced image.

Similarly, when the image transformation system renders a vector drawing segment that is longer than desired, in various embodiments, the image transformation system enables the user to quickly trim down the vector drawing segment. For example, in one or more embodiments, the image transformation system receives a user selection along a rendered vector drawing segment to trim the vector drawing segment at the selected point. In some embodiments, the image transformation system provides visual feedback to the user during the user interaction to identify the portion of the vector drawing segment to remove, as described below.

In some embodiments, the image transformation system also allows for flexible generation of enhanced digital images by modifying the intensity of the edge detection based on the zoom level of the raster image. For example, in one or more embodiments, when a high zoom level is detected, the image transformation system re-generates an edge map using a higher density of available pixels, which results in more detailed edges within the new edge map. When the edge map includes additional detected edges, in some embodiments, the image transformation system also generates and displays more detailed pixel lines. Similarly, when a low zoom level is detected, the image transformation system re-generates an edge map using a lower density of available pixels (e.g., down-sampled pixels), which results in less detailed edges within the new edge map and reduces the number of detected edges within the edge map.

As mentioned above, in one or more embodiments, the image transformation system generates a pixel line corresponding to a detected edge and display the pixel line in the graphical user interface. In one or more embodiments, the image transformation system employs an accurate and efficient pixel stepping process to generate the pixel line. For example, the image transformation system identifies, based on the user's interaction in the raster image, a first pixel of an edge within the edge map. Starting at the first pixel, the image transformation system steps in a first direction to connecting pixels along the edge until a line termination condition is satisfied. In various embodiments, the image transformation system selects the connecting pixels on the edge to step to next based on prioritizing adjacent pixels over diagonal pixels.

Upon satisfying a line termination condition while stepping along the edge, in one or more embodiments, the image transformation system forms a pixel line by adding the first pixel and the connecting pixels to the pixel line. If necessary, the image transformation system repeats the stepping process from the first pixel in the opposite direction along the edge until a line termination condition in the opposite direction is satisfied. Then, as mentioned above, the image transformation system generates an enhanced digital image that includes the vector drawing segment by fitting a Bézier curve to the pixel line.

As mentioned above, the image transformation system steps through connecting pixels along the edge until a line termination condition is met. Indeed, in one or more embodiments, the image transformation system identifies continuous connecting pixels along the edge within the edge map until the edge ends, splits into multiple edges, or intersects with itself (e.g., when the image transformation system starts on a closed-loop edge). In some embodiments, the image transformation system determines an edge split when a connecting pixel has either three adjacent pixels or three diagonal pixels.

As also mentioned above, in one or more embodiments, the image transformation system fits a Bézier curve to a pixel line. In various embodiments, the image transformation system further improves efficiency by utilizing cached matrices of Bézier coefficients to fit Bézier curves to the pixel line. For instance, the image transformation system generates a matrix of Bézier coefficients for a first pixel line of n-pixels by solving a matrix equation to find Bézier coefficients that best fit a Bézier curve to the set of n-pixels of the first pixel line. In addition, the image transformation system caches the matrix of computed Bézier coefficients. Then, upon identifying a second pixel line having n-pixels (e.g., the same number of pixels as the first line), the image transformation system uses the cached matrix to fit a Bézier curve to the second line without having to resolve the matrix equation.

Indeed, the image transformation system need not generate a new matrix of Bézier coefficients if a corresponding matrix is cached. Often, many of the pixel lines to be fitted are the same length, enabling the image transformation system to reuse the same cached matrix, greatly reducing the computer processing needed to compute the optimal Bezier segment representing the pixel line each time a pixel line is fitted with a Bézier curve.

As apparent in the previous description, the image transformation system provides many advantages and benefits over conventional image conversion systems. As an initial matter, the image transformation system requires fewer and less precise user interactions to generate accurate digital vector drawings. As a result, the time and input required by users is significantly reduced relative to conventional systems. Moreover, the image transformation system improves the functionality of computing devices through decreased computer processing, increased flexibility, and reduced memory storage requirements. Additionally, while improving the functionality of computing devices, the image transformation system also produces more accurate results than conventional image conversion systems.

To illustrate, the image transformation system decreases computer processing by efficiently utilizing computing resources through selectively transforming a raster image into a vector drawing. Rather than batch convert all of the detected edges in a raster image into Bézier curves, in one or more embodiments, the image transformation system transforms only pixel lines selected by a user. In this manner, the image transformation system does not waste computing resources by converting and over-processing many edges that a user must immediately remove. Indeed, the image transformation system fits a Bézier curve to a pixel line generated from an edge selected through a user interaction, causing a computing device to only process and fit pixel lines corresponding to those edges actually desired by a user. Additionally, the processes and methods utilized by the image transformation system are reliable as well as streamlined (e.g., less complex) than employed by conventional systems, further reducing the computing resources needed when transforming a raster image into a vector drawing.

As mentioned above, the image transformation system increases flexibility and improves searching. For instance, the image transformation system enables the user to select which edges of a raster image to transform into a vector drawing segment rather than requiring the conversion of all edges in the raster image. Indeed, the image transformation system enables the user to quickly search and identify a desired edge/pixel line in the raster image and, in response, the image transformation system selectively transforms the pixel line into a vector drawing segment. Further, by searching and selecting only desired pixel lines to add to the vector drawing segment, the image transformation system eliminates the computer processing needed to find and remove unnecessary converted vectors and/or fix erroneously converted vectors.

Moreover, the image transformation system reduces memory storage requirements through employing cached matrices of Bézier coefficients. In particular, the image transformation system uses the same cached matrix to fit multiple pixel lines to various Bézier curves rather than having to generate and store new matrices of Bézier coefficients each time a pixel line is to be converted to a Bézier curve. Indeed, by using cached matrices, the image transformation system improves processing efficiency while at the same time reducing memory storage requirements.

Overall, because the image transformation system improves the functionality of computing devices as well as reduces memory storage requirements, most computing devices use the image transformation system to selectively transform a raster image to a vector drawing while achieving highly accurate results. For instance, portable computing devices incapable of converting an entire raster image easily use the image transformation system to transform a raster image into a vector drawing. Indeed, the image transformation system enables portable computing devices to transform high-resolution raster images into vector drawings.

As illustrated by the foregoing discussion, the present disclosure uses a variety of terms to describe features and advantages of the image transformation system. For reference, additional detail is now provided regarding the use of these terms. For example, as used herein, the term "raster image" refers to an electronic or digital image made up of pixels. In particular, the term "raster image" includes an image of one or more raster elements depicted by coloring or shading various pixels in a grid of pixels. Raster images have a fixed resolution and zooming in on a raster image often results in blurring and digital artifacts, as the grid of pixels is magnified without introducing more information. Common examples of raster image file formats include GIF, JPEG, PNG, and TIFF files.

Moreover, as used herein, the term "raster element" refers to an item or object portrayed in a raster image. In particular, a raster element includes a collection of pixels portraying a foreground object/item or a background object/item in a raster image. Thus, in relation to a raster image portraying a dog, a raster element would include pixels portraying the dog.

As used herein, the term "vector drawing" refers to a digital image include a series of mathematical curves and lines. The term "vector drawing" includes one or more vector drawing segments or curves, defined below. Because vector drawings employ mathematical equations to represent edges rather than a grid of pixels, zooming in on a vector drawing does not cause aliasing or digital artifacts along edges of a vector drawing segment. Indeed, a vector drawing is resizable without losing quality in color or smoothness. Common examples of vector file formats include SVG, EPS, and PDF files. As used herein the terms "vector drawing" and "enhanced digital image" are used interchangeably.

As mentioned above, the term "vector drawing segment" refers to a vector-based curve or line within a vector drawing. The term "vector drawing segment" includes a single scalable curve within a vector drawing, a combination of scalable curves, or a scalable straight line. A vector drawing segment includes any parametric curve formulation able to interpolate a dense array of points (e.g., pixels). For example, a vector drawing segment may include a cubic Bézier segment (e.g. a single cubic curve defined by four control points), a cubic Bézier curve (e.g., one or more cubic connected Bézier segments), or a Bézier path (e.g., a combination of Bézier curves and straight lines). Additionally, while Bézier segments and curves are often described herein, the image transformation system may additionally or alternatively use other forms of parametric segments and curves as vector drawing segments, such as Hermite curves, B-splines, non-uniform rational basis splines, Kappa-curves, Catmull-Rom splines or another parameter curve able to approximate a dense series of points.

As used herein, the term "Bézier curve" refers to a parametric curve used to model smooth curves. In general, the term "Bézier curve" includes one or more cubic Bézier segments, where each Bézier segment is defined by multiple points (e.g., a start point, an end point, and two control points). In alternative embodiments, the term "Bézier curve" includes Bézier segments defined for any degree (e.g., linear, quadratic, cubic, etc.).

As used herein, the term "edge map" refers to a digital representation of detected edges of a raster image. The term "edge map" includes a file, matrix, or digital collection (e.g., an image or bitmap) defining the pixels forming the edges of a raster image. The image transformation system identifies edges based on sharp changes in image brightness, shading, or color within the raster image. In one or more embodiments, the image transformation system employs Canny edge detection to detect edges in a raster image. For instance, the image transformation system can utilize the Canny Edge Detection Algorithm described in Canny, J., *A Computational Approach To Edge Detection*, IEEE Trans. Pattern Analysis and Machine Intelligence, 8(6):679-698, 1986, which is incorporated herein by reference in its entirety. In alternative embodiments, the image transformation system employs other edge detection methods or processes to generate an edge map for a raster image. In many embodiments, the edge map includes one-pixel wide edges. Further, when an edge (e.g., a line or curve of a raster element) in the raster image is wider than three pixels, the edge map includes an inner edge and/or an outer edge for the edge.

As used herein, the term "pixel line" refers to a plurality of pixels on an edge (e.g., a subset of pixels of the edge) within an edge map that is displayable in connection with a raster image. The term "pixel line" includes a set of continuous, non-overlapping, and non-splitting pixels in the edge map. In addition, upon determining a pixel line, the image transformation system renders the pixel line as on overlay in a corresponding raster image, as shown and described below.

Figure 7A:
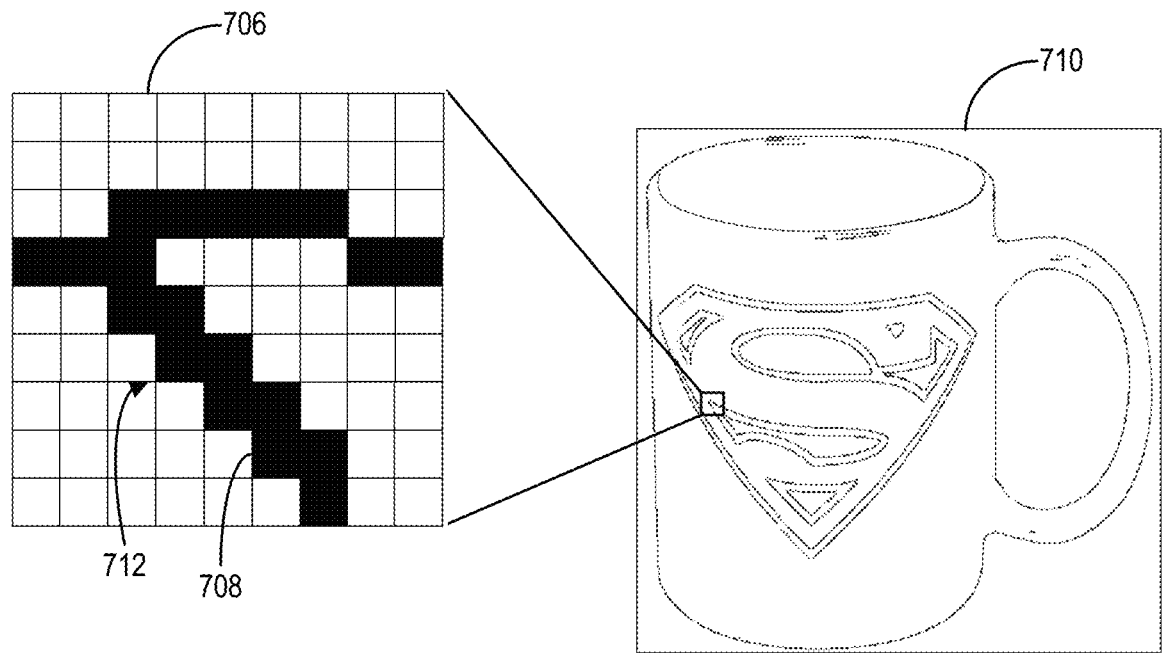
FIGS. 7A-7C illustrate stepping through an edge in an edge map to generate a pixel line in accordance with one or more embodiments.
Figure 7B:
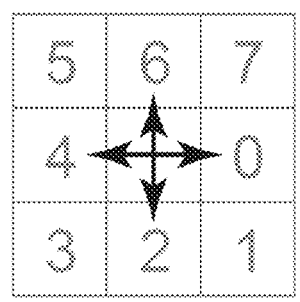
Figure 7B:
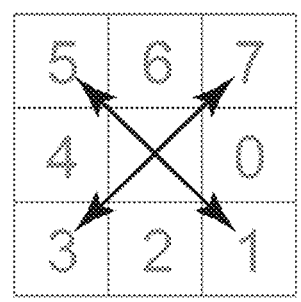

As used herein, the term "connecting pixels" refers to two pixels in an edge map sharing at least one common side or corner. For a given connecting pixel, a connecting pixel is an adjacent pixel (i.e., a pixel sharing one side, such as top, bottom, left, or right, and two corners with the given connecting pixel) or a diagonal pixel (i.e., a pixel sharing one corner, but no sides with the given connecting pixel). Examples of adjacent pixels and diagonal pixels are shown in FIG. 7B. Often, a given connecting pixel on an edge of an edge map has multiple adjacent pixels and/or diagonal pixels.

As mentioned above, the image transformation system generates a pixel line by stepping between connecting pixels along an edge in an edge map until a line termination condition is satisfied. As used herein, the term "line termination condition" refers to a threshold, rule, or state indicating an end of a pixel line. The term "line termination condition" includes stepping to (or reaching) a given pixel with no other connecting pixels that have not been stepped to or added to the pixel line (e.g., the end of an edge). In addition, the term "line termination condition" includes a pixel split (e.g., edge split) where a given pixel includes three adjacent pixels or three diagonal pixels. In addition, the term "line termination condition" includes a connecting pixel, that if stepped to, causes the pixel line to overlap itself (e.g., as in the case of a closed-loop edge). Examples of line termination conditions are shown and provided below.

As used herein, the term "user interaction" refers to user inputs received from an input device. The term "user interaction" includes one or more user inputs within in graphical user interface in connection with transforming one or more edges of a raster image into a vector drawing. In some embodiments, a user interaction includes a user moving a cursor or providing touch input to draw attention to an edge in the raster image. In other embodiments, a user interaction includes a user selecting a pixel line shown within the graphical user interface, which requests the image transformation system to transform the pixel line to a vector drawing segment. Additional examples of user interactions are shown and provided below.

As used herein, the term "cached matrix of Bézier coefficients" or "cached matrix" refers to a digital representation of the coefficients necessary to solve the equation for approximating the best fit of a Bézier curve to a dense collection of points. The term "cached matrix" includes a digital representation of Bézier curve approximation coefficients corresponding to the number of pixels in a pixel line. The storage for the cached matrix of numerical values takes a variety of forms such as a matrix of numbers in memory, database, text file, or other digital representation of Bézier coefficients. For example, the image transformation system uses the same matrix of Bézier coefficients to fit Bézier curves to different pixel lines when the pixels lines include the same number of pixels. In some embodiments, the image transformation system generates (and caches) a matrix of Bézier coefficients if a cached matrix for a particular number of pixels in a pixel line is not located in a cache.

Referring now to the figures, additional description, features, and advantages of one or more embodiments of the image transformation system are provided. To illustrate, FIG. 1 includes an overview of a series of acts 100 of generating a vector drawing from a raster image in accordance with one or more embodiments. In one or more embodiments, the image transformation system performs the series of acts 100. For example, a client device and/or a server device that implements the image transformation system performs the series of acts 100 to generate a vector drawing from a raster image.

As illustrated in FIG. 1, the image transformation system performs an act 102 of generating an edge map for a raster image. For instance, the image transformation system identifies a raster image having a raster element (e.g., a dog) provided by a user. In one or more embodiments, the raster image is provided for display by the image transformation system or another system that includes the image transformation system (e.g., an image editing system).

As mentioned, the image transformation system generates (or receives) an edge map of the raster image. In relation to FIG. 1, the image transformation system uses the edge map in the form of an image indicating where edges are detected in a raster image. The edge map need not be displayed to the user within the graphical user interface, but rather is generated and used in the background of a computing device. Additional detail concerning generating edge maps is provided below in connection with FIGS. 2A-2B.

As shown in FIG. 1, the image transformation system also performs an act 104 of detecting a first user interaction with an edge in the raster image. For example, the user moves a cursor (e.g., via a cursor via a computer mouse or touch input) to an edge in the raster image. As shown in the act 104, the image transformation system detects the first user interaction based on the user moving a cursor near an edge of the raster image corresponding to the outer edge of the dog. Additional detail concerning detecting a user interaction is provided below in connection with FIGS. 2A-2B.

Based on the first user interaction, the image transformation system can generate a pixel line. To illustrate, FIG. 1 shows the image transformation system performing an act 106 of generating a pixel line using the edge map. More specifically, the image transformation system maps the first user interaction in the raster image to identify a corresponding detected edge in the edge map. As a simple illustration, the image transformation system maps the cursor near an edge in the raster image shown in the act 104 to the edge map shown in the act 106 to detect the corresponding edge in the edge map.

Once the image transformation system identifies a detected edge in the edge map corresponding to the user interaction, the image transformation system generates a pixel line by applying a stepping algorithm to the detected edge in the edge map. For example, the image transformation system identifies continuous pixels along the detected edge in the edge map to create the pixel line. Additional detail concerning generating a pixel line is provided below in connection with FIGS. 2B-2E and 6-7C.

In addition, as shown in FIG. 1 the image transformation system also performs an act 108 of displaying the pixel line over the raster image. For instance, upon generating the pixel line from the edge map, the image transformation system displays the pixel line with the raster image in the graphical user interface. For example, in one or more embodiments, the image transformation system maps the pixel line to a bitmap (e.g., image layer) displayed over the raster image. Further, because the edge map is generated from the raster image, the pixel line displays over the edge in the raster image associated with the detected first user interaction. To illustrate, the act 108 shows the image transformation system displaying a pixel line (e.g., the outline of the dog) over the raster image based on the first user interaction (e.g., the position of the cursor next to the outline edge of the dog).

In some embodiments, the first user interaction includes cursor movement amongst edges of the raster image within the graphical user interface. For instance, when the first user interaction moves the cursor from a first edge to a second edge of the raster image, the image transformation system generates a first pixel line for the first edge, then generates a second pixel line for the second edge. In addition, while the cursor is near the first edge, the image transformation system displays the first pixel line, then, when the cursor moves away from the first edge, the image transformation system removes the first pixel line. Upon detecting the cursor near the second edge, the image transformation system displays the second pixel line over the raster image. Notably, when displaying a pixel line over the raster image in response to a first user interaction, the image transformation system delays transforming the pixel line into a vector drawing segment.

As shown in FIG. 1, the image transformation system also performs an act 110 of rendering a vector drawing segment fitted to the pixel line. For instance, the image transformation system detects a second user interaction of a user selecting the pixel line displayed within the graphical user interface (e.g., over the raster image). In response to detecting the second user interaction selecting the pixel line, the image transformation system fits a vector drawing segment, such as a cubic Bézier curve, to the pixel line and renders the vector drawing segment in the graphical user interface (e.g., as a second overlay). Additional detail regarding fitting a vector drawing segment to a pixel line is provided below.

In one or more embodiments, upon generating the vector drawing segment, the image transformation system detects additional user interactions that identify edges and select corresponding pixel lines. In most embodiments, the image transformation system fits a vector drawing segment to the selected pixel line only when a pixel line is selected. In this manner, the image transformation system enables the user to selectively identify which edges/pixel lines of the raster image to transform into a vector drawing without all of the edges being converted or needing to remove unwanted converted edges. Further, by not converting all of the edges of the raster image into a vector drawing, the image transformation system significantly reduces the processing requirements needed to transform a raster image in to a vector drawing.

The next figure provides additional detail for generating a vector drawing from a raster image. For instance, FIGS. 2A-2F illustrate further detail for generating enhanced digital images by transforming raster-based elements in raster images to vector drawing segments in accordance with one or more embodiments. In particular, the image transformation system uses user interactions to transform selected portions of a raster image into a vector drawing.

As shown, FIGS. 2A-2F include a client device 200 having a graphical user interface 202. In one or more embodiments, an image editing system provides the graphical user interface 202 for display on the client device 200. In these embodiments, the image transformation system operates within the image editing system. In alternative embodiments, the image transformation system provides the graphical user interface 202. An example, image editing system is described below along with FIGS. 10 and 11.

The graphical user interface 202, as shown, includes a raster image 204 of a raster element 206 (e.g., a mug with a logo). The raster image 204 represents an imported image provided by a user, such as a raster image captured by a digital camera or downloaded from the Internet. While not shown, the raster image 204 can include multiple raster elements (e.g., objects or subjects).

The raster element 206 within the raster image 204 includes many edges. As mentioned above, the image transformation system determines an edge based on a change in image brightness, shading, or color within the raster image. Indeed, in most raster images, raster elements include edges distinguishing the raster element (e.g., a foreground object) from the background of the image. Likewise, raster elements often include lines, shapes, colors, or patterns that create edges. For example, as shown in FIG. 2A, the raster element 206 in the raster image 204 includes multiple edges including exterior edges and interior edges.

In various embodiments, the image transformation system transforms one or more edges selected by a user into a vector drawing segment based on user interactions. By way of context, a user interaction can include a single interaction, or combination of interactions, received from a user by way of one or more input devices (e.g., a text input device, a pointer device, and/or a touchscreen). In one or more embodiments, the image transformation system detects user interactions with the graphical user interface 202 based on cursor movements and selections (e.g., "clicks") provided by the user (or other user input, such as touch, drag, and/or release events on a touchscreen).

Figure 2A:
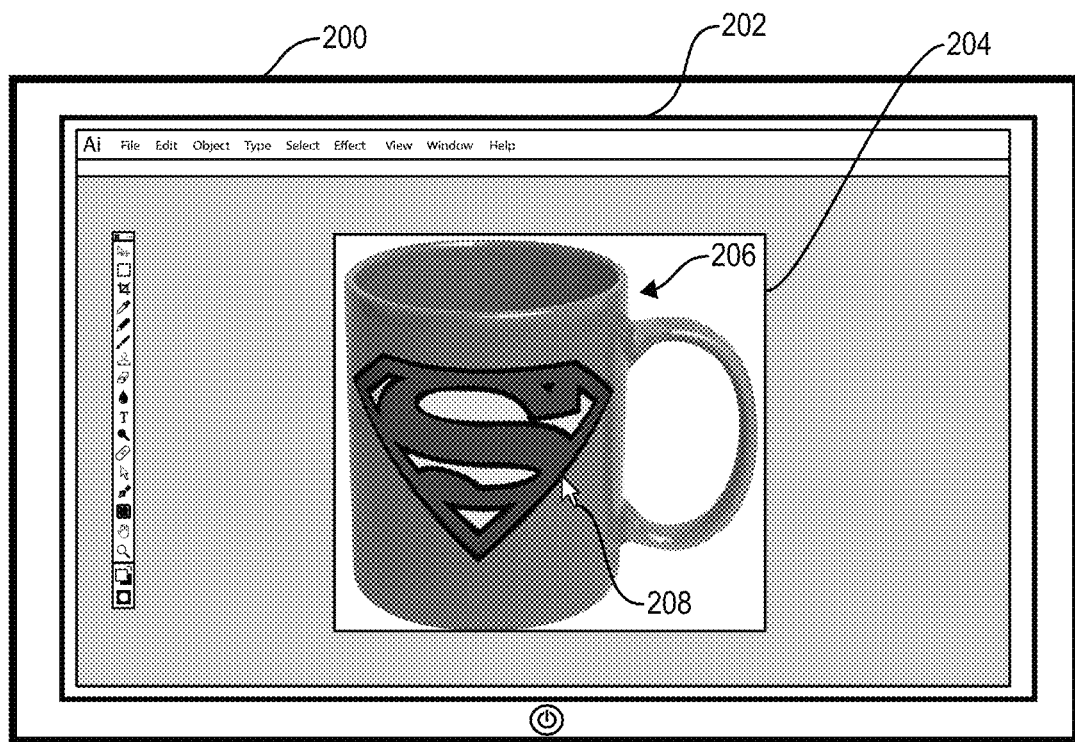
FIGS. 2A-2G illustrate generating enhanced digital images by transforming raster images in raster images to vector drawing segments in accordance with one or more embodiments.

As shown in FIG. 2A, the graphical user interface 202 includes a cursor 208 (e.g., digital mouse pointer) indicating the position or location of a user interaction. For ease of explanation, a cursor is displayed within a graphical user interface in many of the figures. However, the image transformation system can perform the actions described herein without displaying a cursor. For example, rather than using cursor movements and selections to detect user interactions, the image transformation system uses other inputs (e.g., touchscreen inputs) to detect user interactions. Indeed, many mobile client devices do not display a cursor. Thus, while a cursor is shown and described with respect to detecting user interactions, the image transformation system similarly detects user interactions through additional or alternative methods.

In one or more embodiments, the image transformation system detects movements of the cursor 208 within the graphical user interface 202 (e.g., receives cursor positions from an operating system on the client device 200) as well as detects selections (e.g., "clicks") of the cursor 208. For example, as shown in FIG. 2A, the image transformation system detects the user moving the cursor 208 near the outside edge of the logo on the raster element 206. In various embodiments, the image transformation system uses the position of the cursor 208 to detect an edge of the raster element 206 the user desires to vectorize (e.g., transform into a vector drawing segment).

In one or more embodiments, prior to transforming a selected edge into a vector drawing segment, the image transformation system first detects edges of the raster element 206. Indeed, in one or more embodiments, the image transformation system first determines which pixels in the raster image 204 make up an edge. In various embodiments, the image transformation system determines edges in the raster image 204 by generating an edge map.

The image transformation system generates an edge map using an edge detector algorithm. For example, in some embodiments, the image transformation system utilizes the Canny edge detector to generate a raster bitmap representation (i.e., edge map) of the raster image 204. In alternative embodiments, the image transformation system utilizes another edge detector and/or algorithm to detect edges within the raster image 204. Regardless of the edge detector or algorithm used, when generating the edge map, in one or more embodiments, the image transformation system ensures that detected edges in the raster image 204 are represented as single-pixel-wide (i.e., 1-pixel wide) lines in the edge map 210.

Figure 2B:
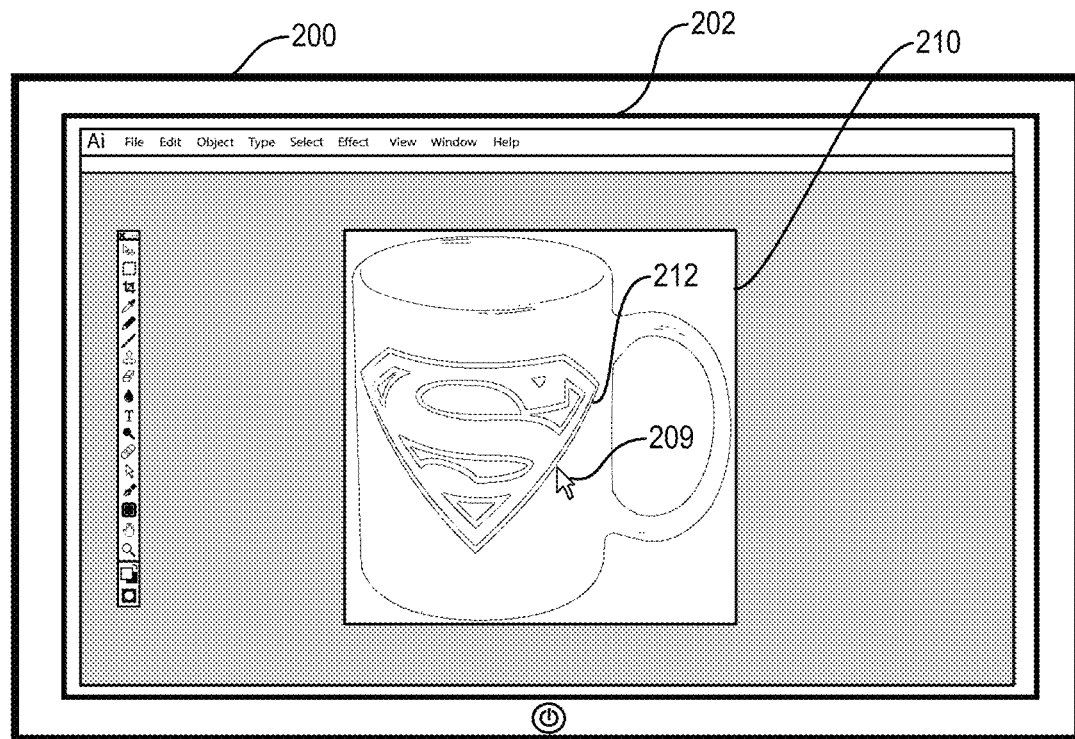

To illustrate, FIG. 2B shows an edge map 210 of the raster image 204 generated by the image transformation system. Each detected edge in the edge map 210 is represented by a single-pixel-wide line. In some instances, the image transformation system represents a thicker line or shape in the raster image 204 (e.g., a line or shape that is at least three-pixels wide) using multiple single-pixel-wide lines. When a thicker line or shape appear in the raster image 204, the image transformation system identifies multiple edges associated with the line or shape (e.g., a shape with an inner edge an outer edge or a line with two outer edges). For example, because the border around the logo in the raster image 204 is thicker, the image transformation system detects an outer single-pixel-wide line and an inner single-pixel-wide line in the corresponding edge map 210.

When performing edge detection of edges in the raster image 204, the image transformation system uses various edge detection parameters and/or pixel densities of available pixels to detect more or fewer edges. For example, the image transformation system modifies one or more edge detection parameters to increase the number of edges detected in the raster image 204 (e.g., detect weaker or lower-contrasting edges). Conversely, the image transformation system modifies one or more edge detection parameters to decrease the number of edges detected in the raster image 204 (e.g., only detect stronger or higher-contrasting edges), to reduce clutter in highly textured raster images. In some embodiments, as described below with respect to FIGS. 5A-5B, the image transformation system modifies edge detection parameters based on additional factors, such as a selection operation.

In various embodiments, the image transformation system generates an edge map 210 to match the resolution of the raster image 204. By providing an edge map with the same resolution as a raster image, the transformation system easily maps coordinates and pixels between the two bitmaps (i.e., the raster image 204 and the edge map 210), as described below. In alternative embodiments, the image transformation system generates an edge map 210 to have a lower or higher resolution than the raster image 204.

In one or more embodiments, the image transformation system performs pre-processing on the raster image 204 to improve edge detection. For example, the image transformation system applies one or more filters that minimize color, reduce noise, and/or increase the contrast of the raster image 204. For instance, in some embodiments, the image transformation system applies a bilateral filter to reduce noise while retaining edge sharpness of the raster image 204 before performing edge detection and generating the edge map 210.

In some embodiments, the image transformation system generates the edge map upon receiving a request from the user to selectively transform edges on the raster image 204 into a vector drawing (e.g., transform the raster element 206 in the raster image 204 into a vector drawing segment). In alternative embodiments, the image transformation system automatically generates the edge map 210, for example, upon loading the raster image 204 or detecting a selection of a particular image editing tool.

While FIG. 2B shows the edge map 210 within the graphical user interface 202, in one or more embodiments, the image transformation system does not display the edge map 210 to a user within the graphical user interface 202. Indeed, the image transformation system generates the edge map 210 as a raster bitmap image in the background of the client device 200. In alternative embodiments, the image transformation system displays the edge map 210 in connection with the raster image 204. For example, the image transformation system provides the edge map 210 as a layer that can be hidden or revealed within the graphical user interface 202 based on user input (i.e., a user interaction). In another example, the image transformation system displays the edge map 210 as an overlay to the raster image.

As mentioned above in connection with FIG. 2A, the image transformation system detects a user interaction from the user moving the cursor 208 over the raster image 204. Based on the position of the cursor 208 with respect to the raster image 204, the image transformation system identifies a detected edge within the edge map 210. For example, the image transformation system maps the position of the cursor 208 from the raster image 204 to the edge map 210 to identify a detected edge corresponding to the position of the cursor 208.

More particularly, in one or more embodiments, the image transformation system detects the x, y coordinates of the raster image 204 based on the cursor position (i.e., user interaction). Then, the image transformation system maps the raster image coordinates to the edge map 210 to the edge map 210. Indeed, when the raster image 204 and the edge map 210 have the same resolution, there is a one-to-one pixel correspondence. For ease in explanation, the edge map 210 includes a mapped cursor 209 that corresponds to the position of the cursor 208 in FIG. 2A. However, in many embodiments, the edge map 210 does not display or include a cursor, but rather uses the mapped coordinates.

Using the mapped cursor 209 (i.e., the mapped coordinates), the image transformation system determines one or more detected edges within the edge map 210. For instance, in one or more embodiments, the image transformation system determines whether a detected edge is within a threshold distance (e.g., within 3, 5, or 10 pixels) of the mapped cursor. If multiple detected edges are within the threshold distance, the image transformation system identifies the detected edge closest to the position of the mapped cursor 209. Further, in some embodiments, the image transformation system identifies a pixel on a detected edge closest to the position (e.g., x, y coordinates) of the mapped cursor 209. Indeed, the image transformation system compares the coordinates of the mapped cursor 209 or mapped coordinates to the coordinates of one or more pixels along the detected edge to identify the closest pixel.

To illustrate, in response to detecting the user interaction from the user moving the cursor 208 over the raster image 204, the image transformation system identifies the position of the mapped cursor 209 within the edge map 210. Based on the mapped cursor 209, the image transformation system determines that a detected edge 212 is proximate to the mapped coordinates. In addition, the image transformation system identifies a pixel along the detected edge 212 that is closest to the mapped coordinates of the mapped cursor 209.

Upon identifying a detected edge, the image transformation system generates a pixel line for the detected edge. For example, in one or more embodiments, the image transformation system employs a stepping algorithm to generate a continuous, non-terminating line of connecting pixels on the detected edge. In some embodiments, when the image transformation system generates the pixel line, the image transformation system stores the x, y pixel coordinates of each pixel along the detected edge, which is used to define the pixel line. Additional description regarding the image transformation system generating a pixel line from a detected edge of an edge map is provided below with respect to FIGS. 6-7C.

Figure 2C:
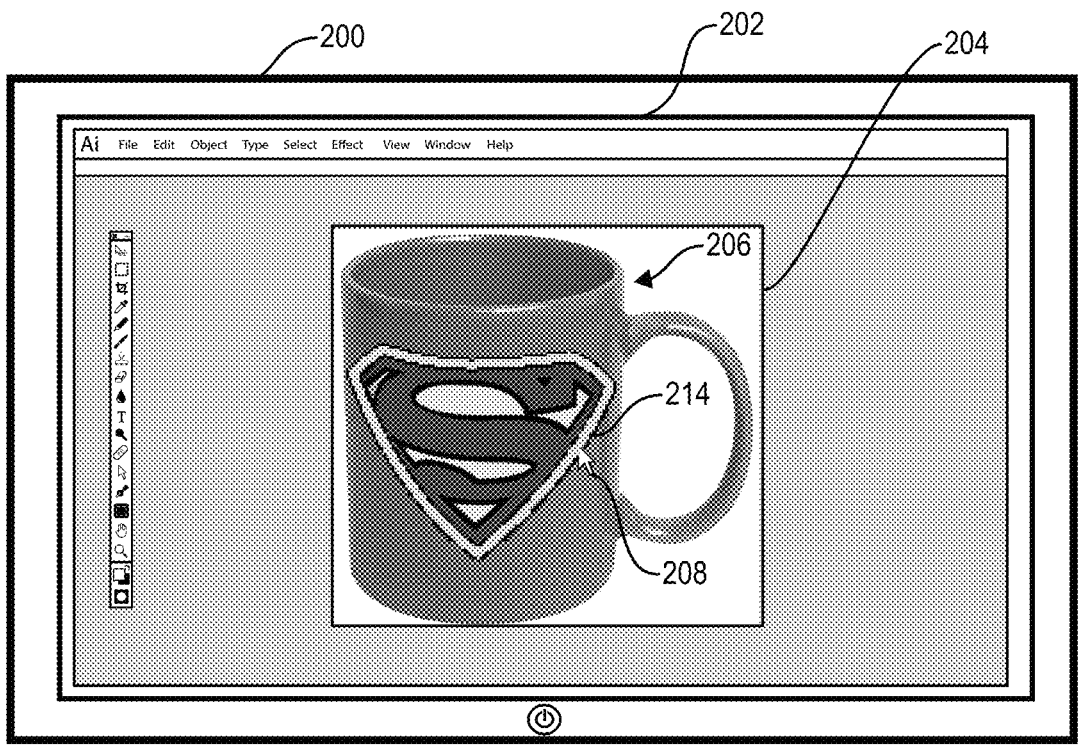

Moreover, the image transformation system displays the pixel line generated based on the detected edge in the edge map over the raster image. To illustrate, FIG. 2C shows a first pixel line 214 highlighting the outer edge of the logo on the mug (i.e., the raster element 206) that corresponds to the generated pixel line. For example, in one or more embodiments, the image transformation system maps the stored pixel coordinates of the pixel line generated from the detected edge 212 in the edge map 210 to the raster image 204 to render the first pixel line 214. As shown, the first pixel line 214 is a raster image of pixels and not a vector drawing segment. Notably, the image transformation system pauses vectorizing the first pixel line 214 until an additional user interaction is detected, as described below.

As mentioned above, the image transformation system highlights the first pixel line 214 when rendered as an overlay to the raster image 204. In various embodiments, the image transformation system highlights or otherwise emphasizes the first pixel line 214 over the raster image. For instance, the image transformation system employs a variety of colors, weights, thicknesses, and/or patterns to contrast the first pixel line 214 with the raster image 204.

In many embodiments, the image transformation system generates the edge map 210, identifies the detected edge 212 in the edge map 210 based on the user interaction, generates the first pixel line 214, and displays the first pixel line 214 in real-time or near real time as a user interacts (e.g. moves a cursor) with the user interface 202. Further, as described previously, the image transformation system often does not display the edge map 210 to a user. Thus, from the perspective of the user, as he or she moves the cursor 208 to an edge of the raster image 204, the image transformation system near-instantaneously displays the first pixel line 214 over an edge near the cursor 208.

In one or more embodiments, the image transformation system maintains the overlay displaying the first pixel line 214 while the cursor 208 is near the first pixel line 214. For example, while the cursor 208 is within a threshold distance (e.g., less than 5 pixels) of the first pixel line 214, the image transformation system displays the first pixel line 214. However, upon detecting a user interaction moving the cursor 208 away from the first pixel line 214 (e.g., beyond the threshold distance), the image transformation system removes the overlay of the first pixel line 214 from over the raster image 204. Indeed, if the detected user interaction signals to the image transformation system that the user is no longer interested in the first pixel line 214, the image transformation system hides or removes the first pixel line 214.

After removing the first pixel line 214, if the image transformation system later detects a subsequent user interaction moving the cursor 208 over the outer logo edge, the image transformation system can again render the first pixel line 214. For example, the image transformation system searches a generated pixel line table or pixel line bitmap to determine if the cursor 208 is over (or within a threshold number of pixels of as well as closer than pixels in another pixel line) a pixel coordinate stored for the first pixel line 214, and if so, renders the first pixel line 214. In alternative embodiments, the image transformation system repeats the steps of identifying the detected edge 212 in the edge map 210 based on the subsequent user interaction, applying the stepping algorithm to the detected edge 212 to generate a new pixel line, and rendering the new pixel line as an overlay to the raster image 204.

Figure 2D:
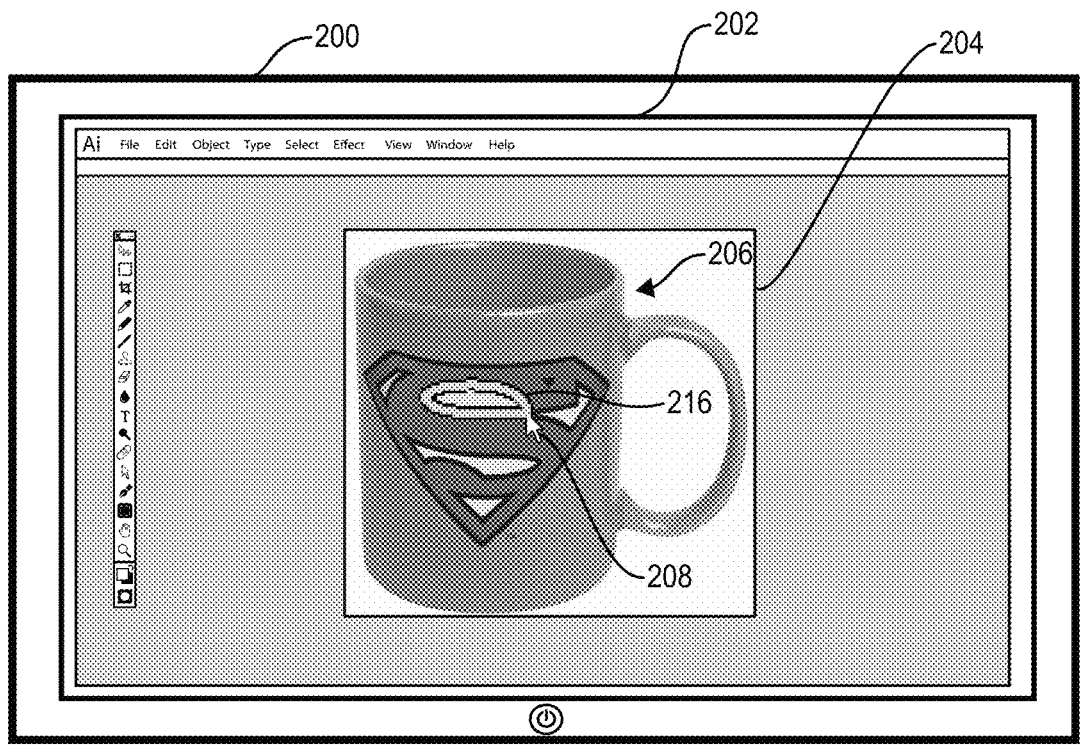
Figure 2E:
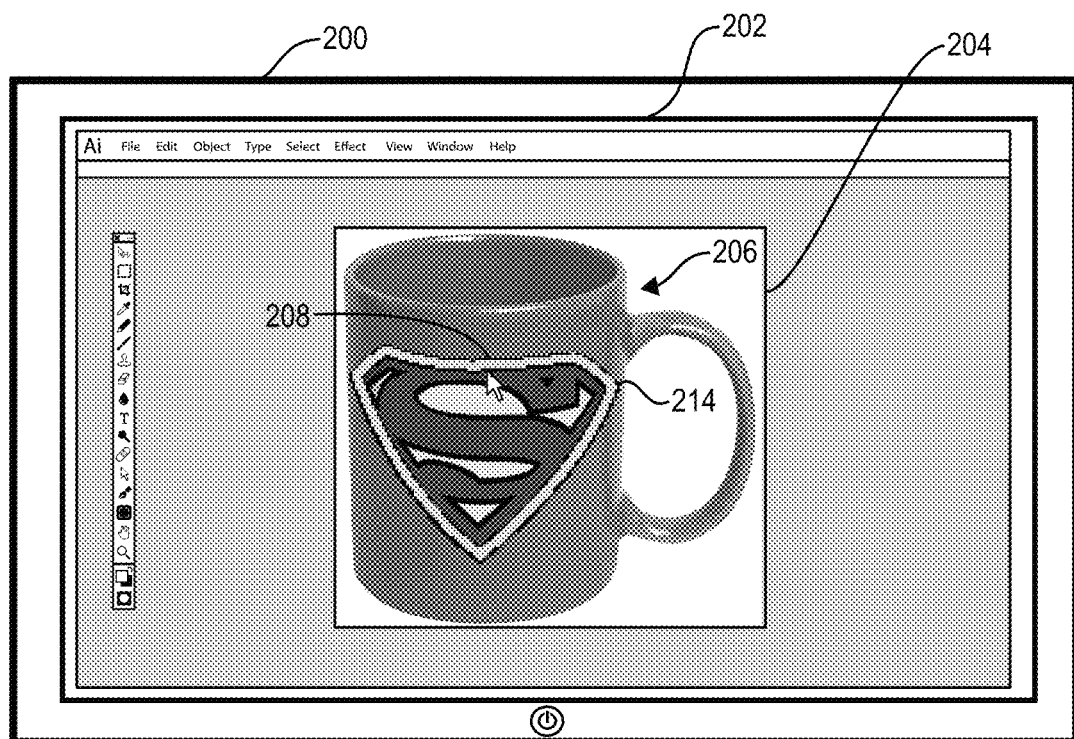

Similarly, when the image transformation system determines that a user interaction moves the cursor 208 to a different edge, the image transformation system generates a second pixel line for the updated position of the cursor 208. To illustrate, FIG. 2D shows a second pixel line 216 displayed as an overlay to the raster image 204 based on the cursor 208 being moved by a user to a different edge within the raster image 204. Then, FIG. 2E shows the image transformation system removing the second pixel line 216 and again displaying the first pixel line 214 based on detecting a user interaction moving the cursor 208 over a portion of the outer edge of the logo.

Indeed, in response to detecting the user moving the cursor 208 over the raster image 204, the image transformation system checks the coordinates of the cursor 208 against detected edges of the edge map 210, and if the mapped coordinates of the mapped cursor 209 are near or over a pixel of a detected edge, the image transformation system generates a pixel line by tracing the detected edge outward from the identified pixel. Further, the image transformation system overlays the pixel line over a corresponding edge in the raster image 204. Then, if the image transformation system detects the user moving the cursor 208 away from a detected edge, the image transformation system removes the pixel line overlay from the graphical user interface.

In most embodiments, the image transformation system only renders a single pixel line at one time above the raster image 204. However, in alternative embodiments, the image transformation system displays more than one pixel line at once. For example, the image transformation system may display a pixel line for a minimum amount of time after the cursor 208 is moved away from the pixel line before removing the pixel line. Further, while the display of a previous pixel line is being maintained, the image transformation system may display a new pixel line.

As mentioned above, the image transformation system renders the first pixel line 214 without vectorizing the first pixel line 214. Indeed, the image transformation system waits to transform the first pixel line 214 into a vector drawing segment, such as a Bézier curve, until the user provides an indication to perform the transformation. For example, the image transformation system detects a user interaction that selects (e.g., clicks, taps, holds down, or presses) a pixel line displayed over the raster image 204. In response, the image transformation system generates a vector drawing segment for the selected pixel line.

Figure 2F:
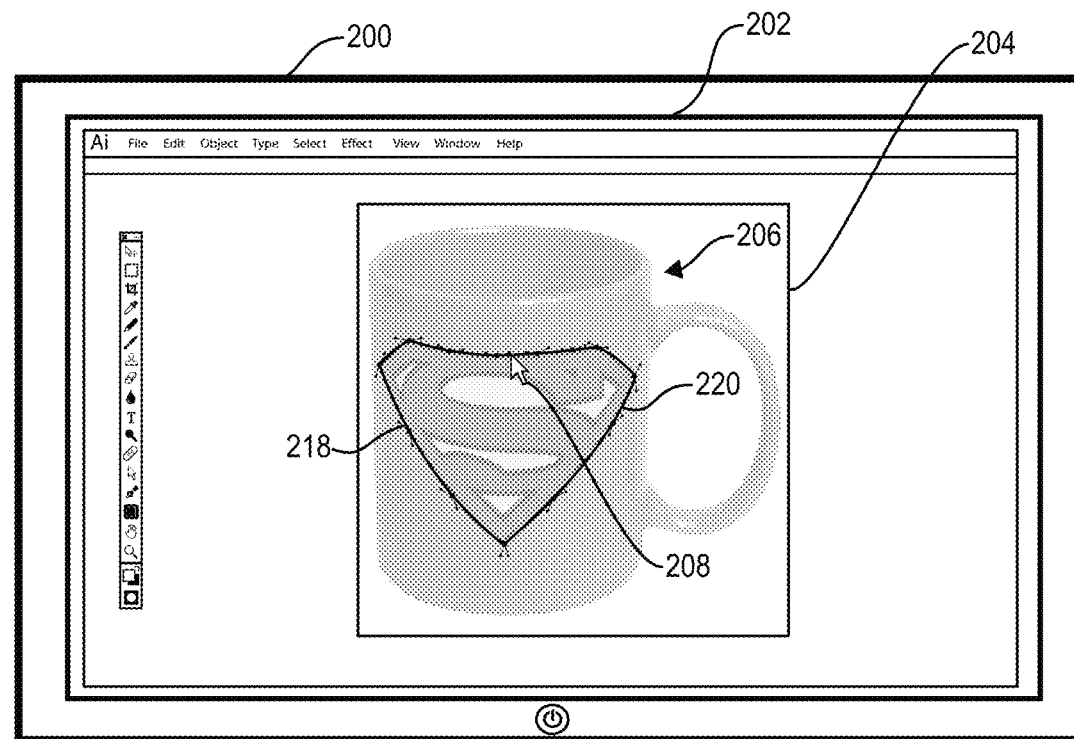

To illustrate, the image transformation system detects a user interaction selecting the first pixel line 214 in FIG. 2E. In response, the image transformation system generates a vector drawing segment for the first pixel line 214, as shown in FIG. 2F. In particular, FIG. 2F shows a vector drawing segment 220 in place of the first pixel line 214. In one or more embodiments, the image transformation system provides the vector drawing segment 220 in a separate overlay (e.g., layer) that includes each of the vector drawing segments transformed from selected pixel lines (e.g., a vector drawing layer).

In various embodiments, the image transformation system transforms the selected pixel line into a vector drawing segment by fitting a Bézier curve to the selected pixel line. For example, the image transformation system uses the coordinates of the selected pixel line to fit a Bézier curve to the selected pixel line. In particular, the image transformation system may fit multiple Bézier curves to a pixel line to ensure a smooth, accurate and close fit. Additional description regarding fitting Bézier curves to a selected pixel line is provided below with respect to FIGS. 8-9.

In addition, FIG. 2F shows vector controls 218 (e.g., control lines and control points) in connection with the vector drawing segment 220. In one or more embodiments, the image transformation system provides vector controls 218 to a user to further modify the vector drawing segment 220 to suit a user's preferences. In embodiments where a vector drawing segment 220 is made up of multiple Bézier curves, the image transformation system can provide vector controls 218 for each Bézier curve. Further, in various embodiments, the image transformation system hides the vector controls 218 for the graphical user interface 202 until the user selects the vector drawing segment 220 and/or an option to show the vector controls 218.

Figure 2G:
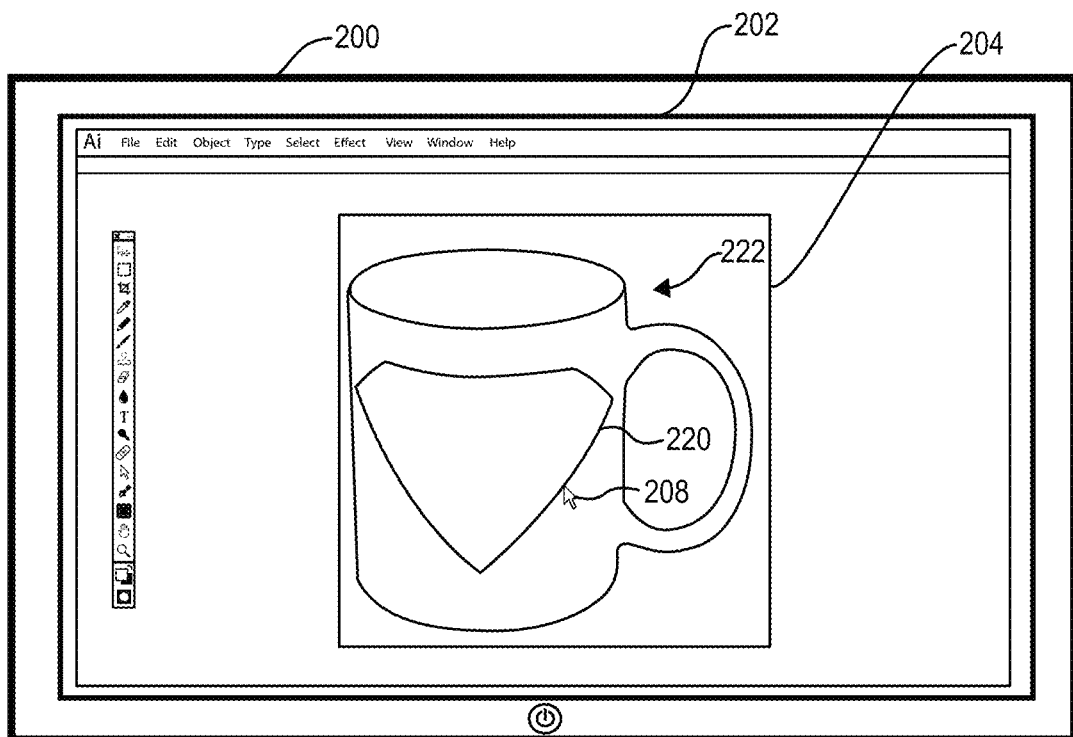

Upon rendering the vector drawing segment 220, the image transformation system provides a vector drawing to the user. For instance, the image transformation system provides a selectable option for the user to remove the raster image 204 and/or display a vector drawing of the vector drawing segment 220 in a separate image. To illustrate, FIG. 2G shows the vector drawing 222 that includes the vector drawing segment 220. In addition, the vector drawing 222 includes additional vector drawing segments (e.g., pixel lines corresponding to the outer edges of the mug) selected by the user and transformed by the image transformation system.

As described above, the image transformation system provides many advantages by not vectorizing a pixel line until user input is received to transform a pixel line into a vector drawing segment. For example, unlike conventional systems that perform batch conversions, only edges desired by the user are transformed, providing a flexibility not achievable by conventional systems. Further, this selective transformation not only simplifies and reduces image editing time to a user through increased flexibility, the selective transformation also reduces computational steps by not transforming undesirable edges/pixel lines that the user must manually remove. Indeed, the image transformation system achieves greater computational efficiency over conventional systems by transforming fewer edges. This also reduces memory usage.

As another advantage, the image transformation system provides increased accuracy over conventional systems by allowing the user to verify an edge or a portion of an edge of a raster image to transform into a vector drawing segment. However, if the image transformation system transforms an edge incorrectly, the image transformation system provides options and tools enabling the user to immediately remedy the error and achieve the desired vector drawing segment.

The image transformation system can incorrectly transform portions of an edge into a vector drawing segment by transforming too little (e.g., too short) or too much (e.g., too long) of the edge into a vector drawing segment. As an overview, FIGS. 3A-3B describe enabling a user to easily enlarge a vector drawing segment. FIGS. 4A-4F describe trimming a vector drawing segment to a desired length.

Figure 3A:
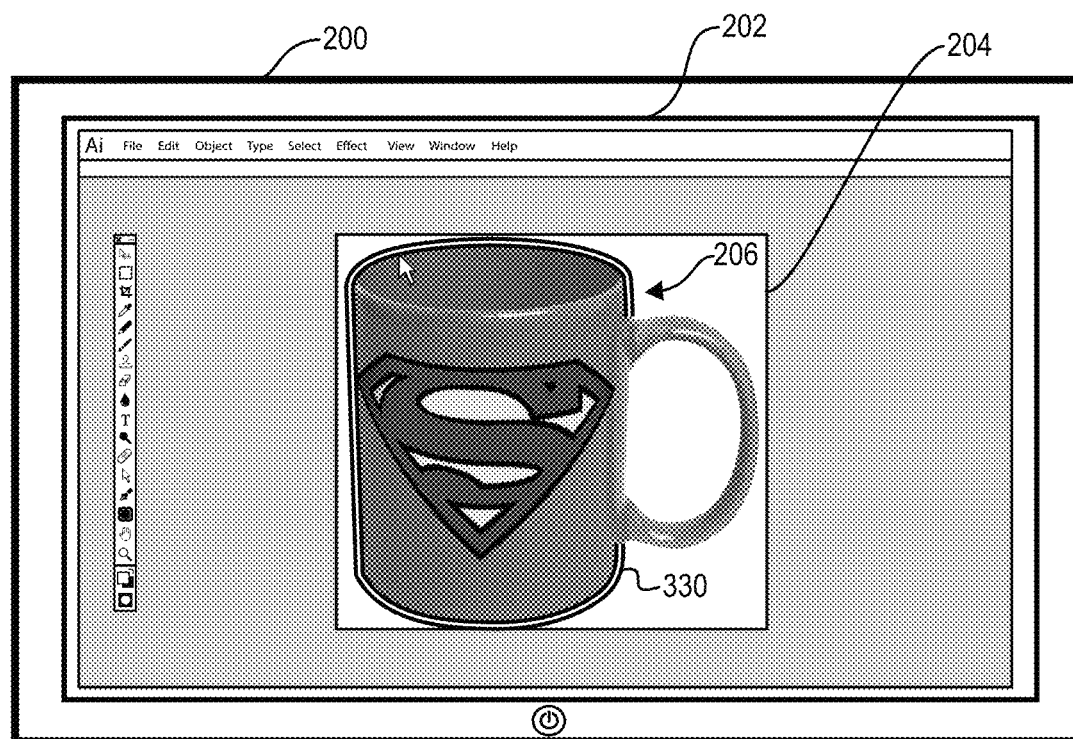
FIGS. 3A-3C illustrate connecting multiple vector curves together to form a vector drawing segment in accordance with one or more embodiments.
Figure 3B:
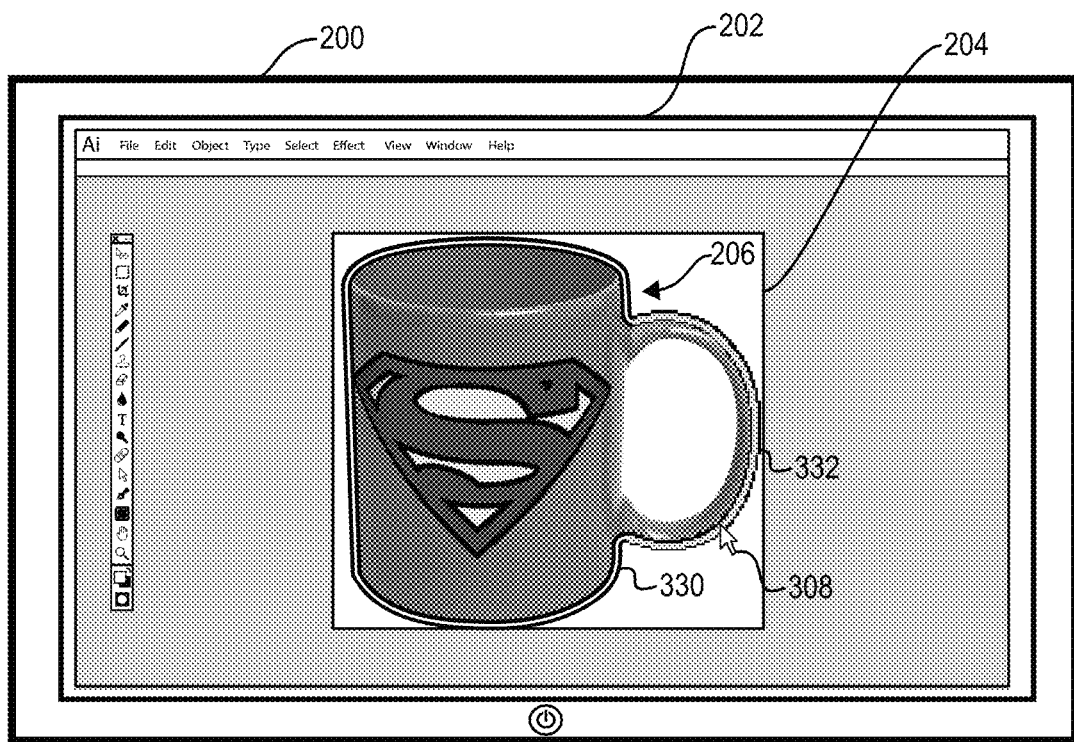
Figure 3C:
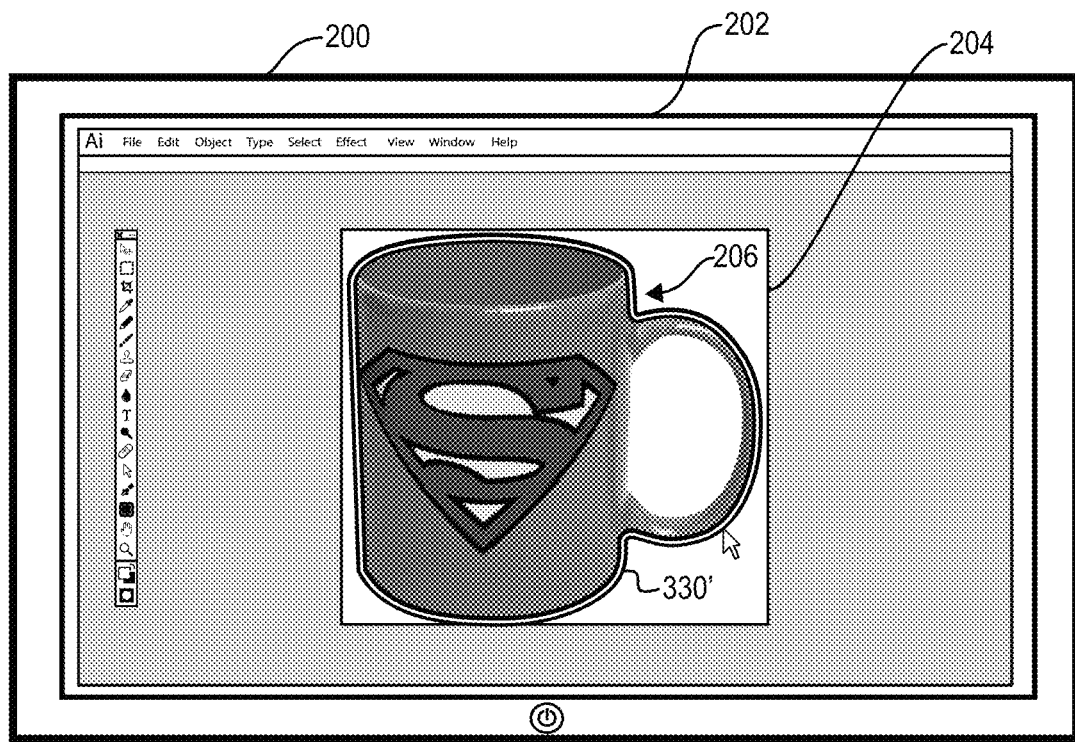

In particular, FIGS. 3A-3C illustrate connecting multiple vector curves together to form a vector drawing segment in accordance with one or more embodiments. As shown, FIGS. 3A-3C include the client device 200, graphical user interface 202, raster image 204, and raster element 206 (e.g., mug) described above in connection with FIGS. 2A-2F.

As mentioned above, in some instances, a pixel line or a vector drawing segment is shorter than desired by a user. To illustrate, FIG. 3A shows a vector drawing segment 330 that wraps around most, but not all, of the outside edge of the raster element 206. If the user desires a vector drawing segment that surrounds the raster element 206, the image transformation system enables the user to extend the vector drawing segment 330 or connect the vector drawing segment 330 to an additional vector drawing segment.

To illustrate, in FIG. 3B, the image transformation system detects a user interaction moving the cursor 308 to the outside edge of the mug handle (i.e., the raster element 206). As described above, the image transformation system identifies a detected edge within a corresponding edge map (e.g., the edge map 210), generate a pixel line based on the detected edge, and render the pixel line over the raster image 204. For example, as shown, the image transformation system renders the pixel line 332 over the outer edge of the mug handle in raster image 204 based on detecting the user interaction moving the cursor 308.

As shown, FIG. 3B includes both the vector drawing segment 330 and the pixel line 332. Indeed, while the image transformation system primarily displays one pixel line at a time, the image transformation system can show a pixel line along with one or more vector drawing segments. Upon detecting a user interaction selecting the pixel line 332, the image transformation system can transform the pixel line into a new vector drawing segment.

In addition, the image transformation system can connect two adjacent vector drawing segments, as shown by the expanded vector drawing segment 330' in FIG. 3C. For instance, in one or more embodiments, the image transformation system connects two adjacent vector drawing segments based on the user providing an indication to connect the vector drawing segments. For example, the user holds down a modifier key or selects the pixel line 332 with the cursor 208 and drags it over the vector drawing segment 330 before releasing the cursor 208 to provide the image transformation system with a request to join the vector drawing segments together. In alternative embodiments, the image transformation system automatically connects adjacent vector drawing segments in the vector drawing. For example, when a connection option is on, the image transformation system automatically connects adjacent vector drawing segments. Further, the image transformation system can automatically connect vector drawing segments that are not adjacent, but within a threshold distance (e.g., 3-5 pixels) of each other.

In one or more embodiments, the image transformation system connects two adjacent vector drawing segments by linking the ends of the two vector drawing segments together. For example, the image transformation system links one vector drawing segment to another vector drawing segment using one or more anchor points. In another example, the image transformation system connects the vector drawing segments ensuring $C^1$ or $C^2$ continuity. For example, $C^1$ continuity refers to a measure of curve smoothness where two curves connect such that the tangent angles of the two curves match at the connection.

In some embodiments, the image transformation system connects two vector drawing segments together by refitting a Bézier curve to a combined pixel line. For example, the image transformation system combines the pixel line from which a first vector drawing segment was fitted with the second pixel line being selected by the user. Based on the combined pixel line, the image transformation system refits a Bézier curve to generate a vector drawing segment. In some instances, the image transformation system fits a single curve to the combined pixel line (or at least across the connection of the two pixel lines), resulting in a more aesthetically pleasing curve or line than multiple curves linked together.

As mentioned above, the image transformation system enables a user to trim a vector drawing segment upon generating the vector drawing segment. To illustrate, FIGS. 4A-4F illustrate examples of efficiently trimming vector curves with minimal user interactions in accordance with one or more embodiments. As shown, FIGS. 4A-4F include the client device 200 having a graphical user interface 402. As described above, in some embodiments, the client device 200 includes an image editing system that provides graphical user interfaces. For example, the image editing system provides the graphical user interface 402, where the image transformation system operates within the image editing system. In alternative embodiments, the image transformation system provides the graphical user interface 402.

Figure 4A:
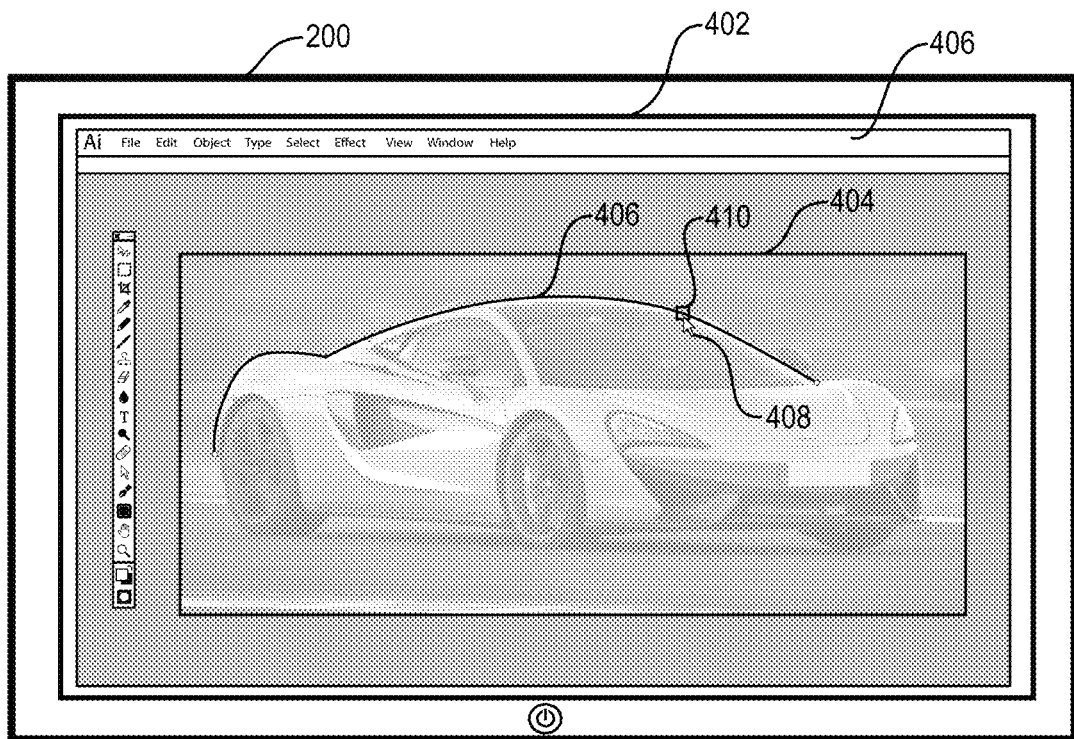
FIGS. 4A-4F illustrate trimming vector curves with minimal user interactions in accordance with one or more embodiments.

The graphical user interface 402, as shown, includes a raster image 404 with a raster element (e.g., a sports car). In FIG. 4A, the graphical user interface 402 displays a vector drawing segment 406 (e.g., a cubic Bézier segment of multiple Bézier curves). For example, the image transformation system generates the vector drawing segment 406 based on the user selecting a corresponding pixel line, as described above.

To trim the vector drawing segment 406, in one or more embodiments, the image transformation system enables the user to select where to trim the vector drawing segment 406. In particular, as shown in FIG. 4A, the image transformation system detects a user selection of a partition point 410 along the vector drawing segment 406. For example, the user moves the cursor 408 over the vector drawing segment 406 and selects the partition point 410 where the user desires to trim the vector drawing segment 406. In response, the image transformation system adds a visual point or indication showing the partition point 410.

Figure 4B:
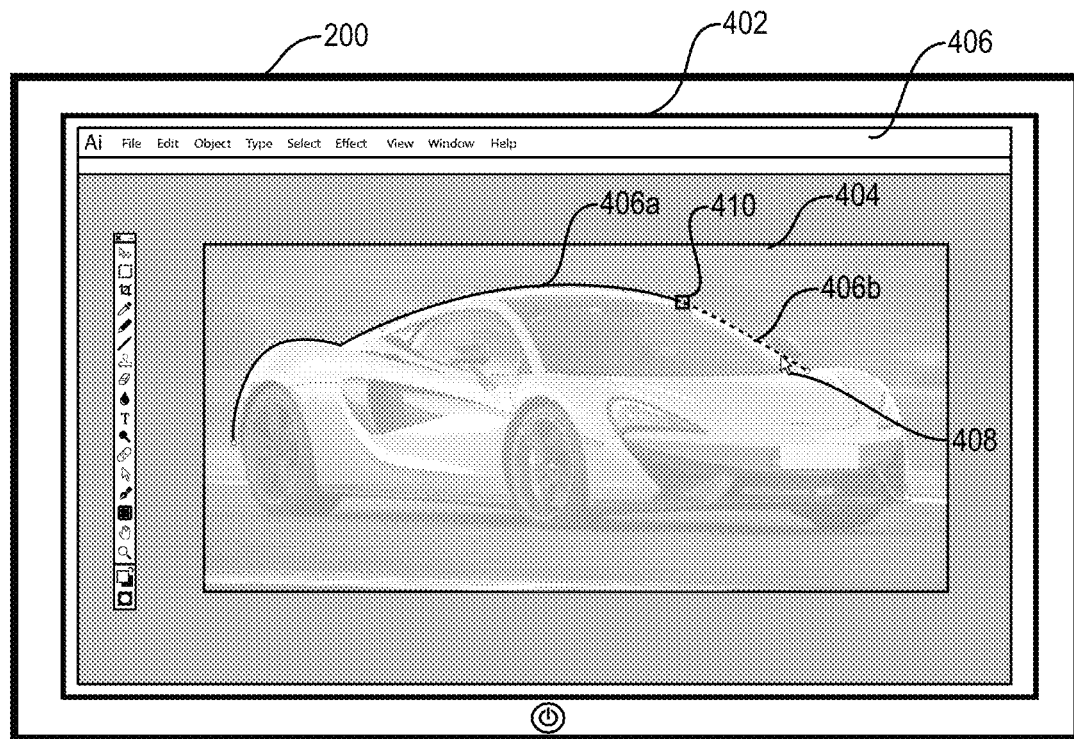

In addition, upon the user selecting the partition point 410, the image transformation system partitions or separates the vector drawing segment 406 into two portions. For example, FIG. 4B shows a first portion 406a and a second portion 406b. Further, upon setting the partition point 410, the image transformation system identifies a portion to remove based on a detected user interaction.

To illustrate, as shown in FIG. 4B, upon setting the partition point 410, the image transformation system detects cursor movement toward the second portion 406b of the vector drawing segment 406. In response, the image transformation system visually modifies the second portion 406b of the vector drawing segment 406 to show the user which portion of the vector drawing segment 406 is to be trimmed. For example, as shown, the image transformation system changes the pattern of the second portion 406b of the vector drawing segment 406, such as rendering the second portion 406b as a dotted or dashed line. In other embodiments, the image transformation system highlights, bolds, colors, weights, shades, makes more transparent, or hides the second portion 406b of the vector drawing segment 406. In alternative embodiments, rather than visually modifying the second portion, the image transformation system modifies the first portion 406a that is maintained upon trimming the vector drawing segment.

Figure 4C:
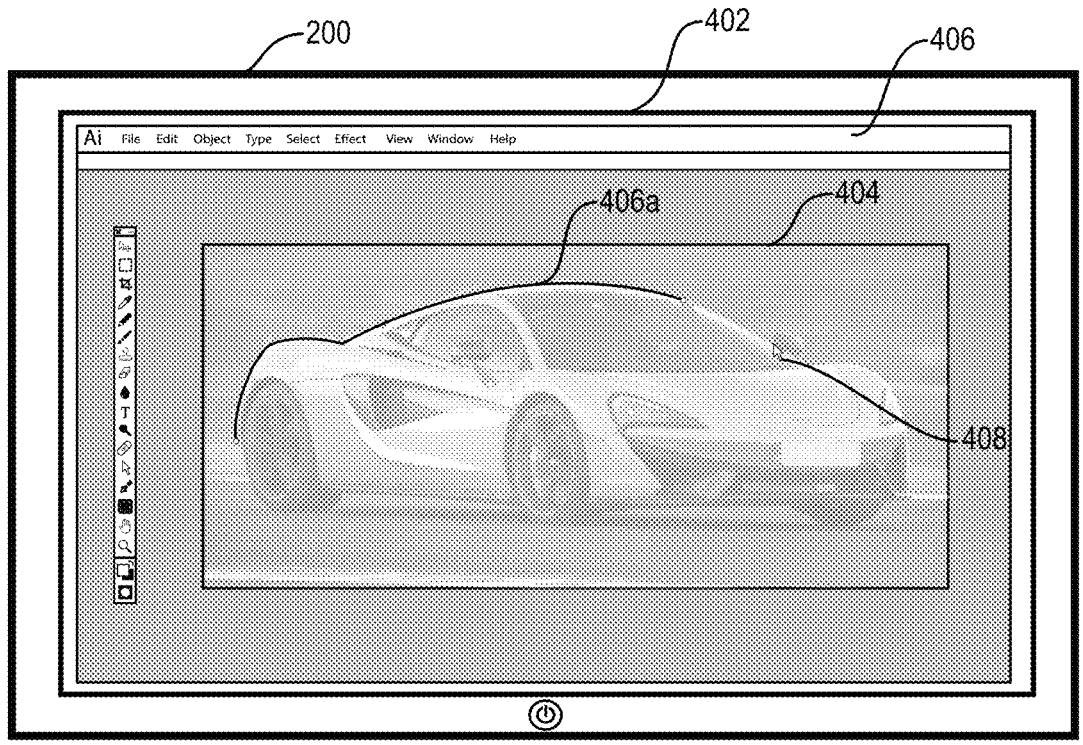

After identifying which portion of the vector drawing segment 406 to trim based on the user interaction (e.g., the cursor 408 being moved toward the second portion 406b), the image transformation system removes the identified portion based on detecting further user input. For example, upon receiving a selection of the second portion 406b of the vector drawing segment 406, the image transformation system trims the vector drawing segment 406 to include only the first portion 406a of the vector drawing segment 406, as shown in FIG. 4C. The image transformation system trims the vector drawing segment 406 by refitting a Bézier curve, as indicated above.

In one or more embodiments, the image transformation system trims the vector drawing segment 406 based on a single user interaction. For example, the image transformation system detects the start of a user interaction with the user selecting the partition point 410 (e.g., pressing down on a mouse button or pressing a touchscreen). In addition, while maintaining the selection (e.g., holding down a mouse button or touchscreen input), the image transformation system detects the cursor 408 moving toward the second portion 406b of the vector drawing segment 406. Then, upon detecting the end of the user interaction (e.g., releasing the mouse button or lifting off the touchscreen), the image transformation system removes the second portion 406b. In this manner, the image transformation system enables the user to quickly and effortlessly trim a newly generated vector drawing segment 406 with a single user interaction (e.g., click, drag, and release). Further, the image transformation system enables the user to trim a vector drawing segment without changing tools within the graphical user interface 402.

In alternative embodiments, the image transformation system trims the vector drawing segment 406 based on detecting multiple user interactions. For example, the image transformation system detects a first interaction selecting the partition point 410. Then, the image transformation system detects a second interaction selecting the second portion 406b of the vector drawing segment 406 for removal.

Further, in addition to trimming a newly generated vector drawing segment, the image transformation system can likewise trim an existing vector drawing segment (e.g., Bézier curve). For example, upon selecting a trim tool or a modifier input (e.g., hold down a keyboard key or key combination), the image transformation system enables a user to select a partition point and trim a vector drawing segment as described previously.

In one or more embodiments, the image transformation system further assists a user in trimming a vector drawing segment. For example, upon detecting the cursor 408 approaching within a predetermined distance (e.g., within 5 pixels) of a vector drawing segment and before the user selects the partition point, the image transformation system renders a spot on the curve of the vector drawing segment closest to the cursor 408. Further, as the cursor 408 moves within the predetermined distance, the image transformation system tracks the cursor 408 along the vector drawing segment by displaying the point on the vector drawing segment that is closest to the cursor 408. In this manner, the image transformation system provides precise feedback to the user on where the partition point will be placed upon detecting a user selection.

Figure 4D:
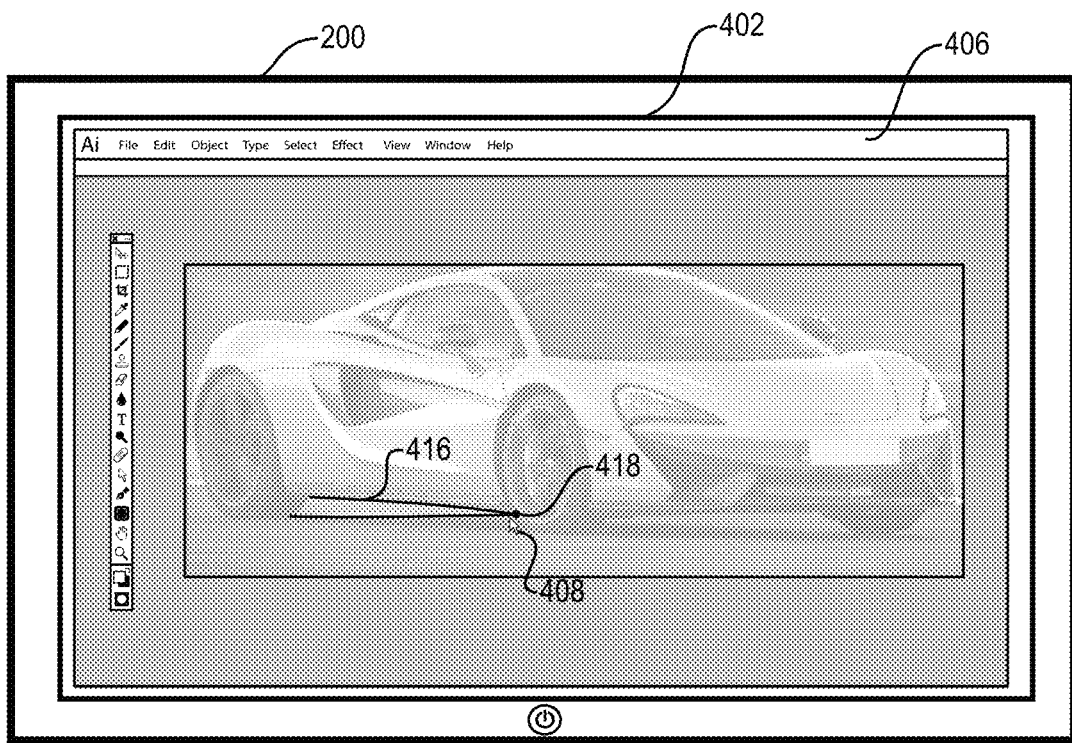

In additional embodiments, as shown in FIG. 4D, the image transformation system gives preference to corners while tracking the cursor 408. As shown, a vector drawing segment 416 includes one corner. When tracking the cursor 408 along the vector drawing segment 416, the image transformation system detects that the cursor 408 and/or the tracked point along the vector drawing segment 416 is within a corner threshold distance of a corner (e.g., 10 pixels or a user-defined distance). In response, the image transformation system snaps the tracked point along the vector drawing segment 416 to the corner.

Preference is given to corners as users can prefer to trim vector drawing segments at corners rather than near the corner. Further, the predetermined distance for tracking the cursor 408 along the vector drawing segment 416 and the corner threshold distance for snapping the cursor to a corner can be set to any pixel distance and can change based on zoom level. However, in most embodiments, the corner threshold distance should be greater than the predetermined distance threshold to ensure that the image transformation system gives preference to corner points.

Figure 4E:
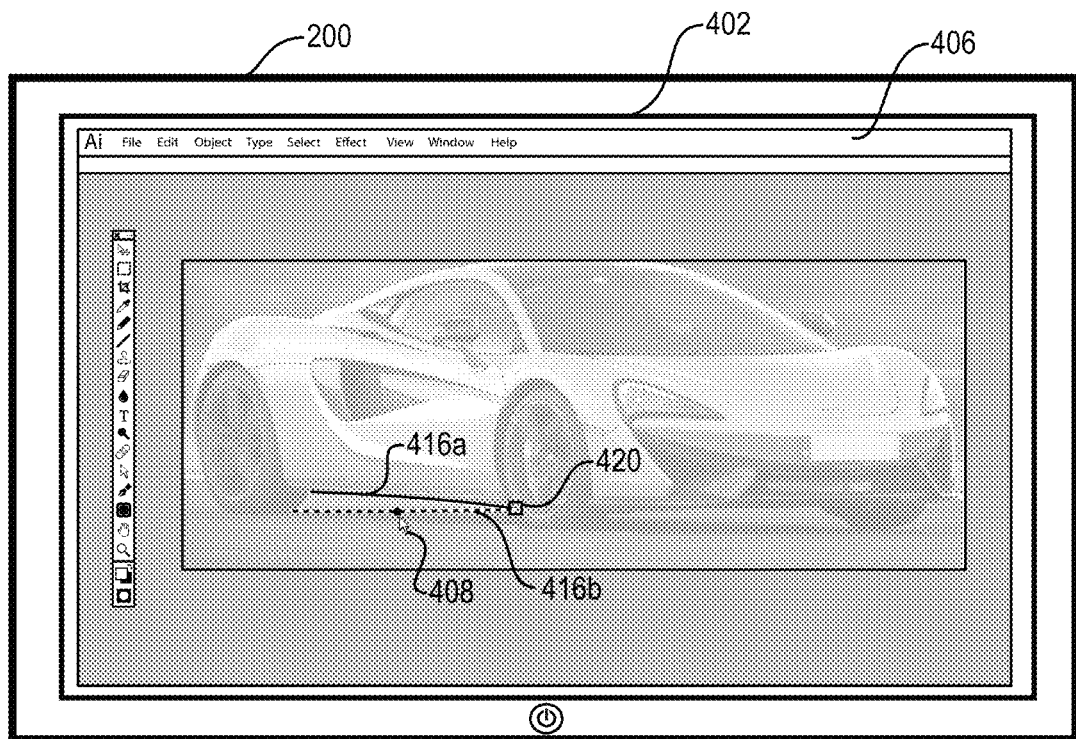
Figure 4F:
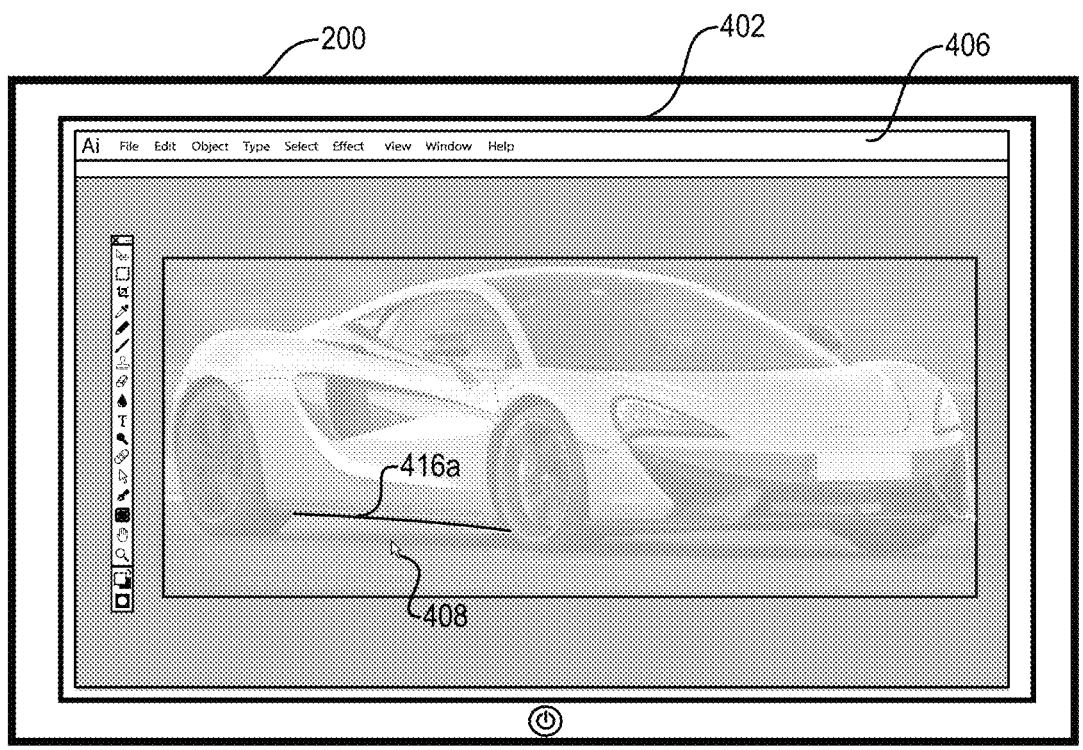

As shown in FIG. 4D, the image transformation system detects that the cursor 408 is near a corner of the vector drawing segment 416 and places a visual guide point 418 at the corner of the vector drawing segment 416. As shown in FIG. 4E, the image transformation system detects a user interaction selecting the corner as a partition point 420. For example, with the visual guide point 418 snapping to the corner, the image transformation system detected a user interaction selecting the corner as the desired location for the partition point 420. Upon the user selecting the partition point at the corner, the image transformation system can divide the vector drawing segment 416 into two portions (e.g., a bottom portion and a top portion), as described above.

As also shown, in FIG. 4D, the image transformation system detects the cursor 408 moving toward the bottom portion of the vector drawing segment 416. The image transformation system identifies which portion of the vector drawing segment 416 to remove based on which portion of the vector drawing segment 416 is closer to the cursor 408. In this manner, the image transformation system identifies the portions of the vector drawing segment 416 to remove based on the user moving the cursor 408. Further, only minimal cursor movements are required to signal which portion of a vector drawing segment 416 is to be removed. In some embodiments, the portion must be within a threshold removal distance to be identified as the portion of the vector drawing segment 416 to be removed.

As described above, in one or more embodiments, the image transformation system delays removing the identified portion until additional user input is received confirming removal of the identified portion. A shown in FIG. 4F, the image transformation system removes the bottom portion of the vector drawing segment 416 based on detecting a user interaction (or portion of a user interaction) confirming removal of the bottom portion of the vector drawing segment 416.

In some embodiments, when the image transformation system is trimming a vector drawing segment generated based on a pixel line traced in an edge map, the image transformation system marks the partition point (the point where the vector drawing segment is trimmed) in the edge map. In this manner, future pixel lines and/or vector drawing segments generated based on the edge map also stop at the partition point indicated by the user. Indeed, the image transformation system implements the user-selected partition point when generating future pixel lines and vector drawing segments in connection with the raster image 404.

In various embodiments, the image transformation system can trim a sub-section of a vector drawing segment. For example, the image transformation system enables the user to select two partition points along the vector drawing segment as well as provide a selection to remove the portion of the vector drawing segment between the partition points. To illustrate, upon receiving a selection of a first partition point, if the image transformation system detects selection of a second point on the vector drawing segment, the image transformation system adds a second partition point to the vector drawing segment. In some embodiments, the user indicates a desire to add a second partition point based on holding down a modifier input. In alternative embodiments, the user indicates a desire to add a second partition point by pressing down on the cursor 408 at the first partition point and releasing the cursor 408 at the second partition point over the vector drawing segment, rather than releasing the cursor 408 near, but not over, the vector drawing segment, which trims the vector drawing segment only at the first partition point, as described above.

In addition to enabling a user to enlarge and trim vector drawing segments, the image transformation system provides additional vector drawing segment editing features to a user to better assist the user in transforming a raster image into a vector drawing. To illustrate, in one or more embodiments, the image transformation system enables a user to move (e.g., drag) a vector drawing segment rendered for one edge in the raster image to another edge. This feature is useful for raster images having a higher density of edges near one another and where the user may initially select the wrong edge to transform into a vector drawing segment. Indeed, the image transformation system enables the user to select a vector drawing segment and move the vector drawing segment over another edge, upon which, the image transformation system refits the vector drawing segment to the other edge.

More specifically, the image transformation system detects a user interaction selecting a vector drawing segment rendered in the graphical user interface with a request to move the vector drawing segment. For example, the image transformation system detects a user selecting a vector drawing segment (e.g., moving a cursor over the vector drawing segment and clicking a mouse button) and moving the vector drawing segment while maintaining the selection of the vector drawing segment (e.g., holding down the mouse button while moving the cursor). In some embodiments, the image transformation system determines a user request to move a vector drawing segment from the user interaction itself. In alternative embodiments, the image transformation system associates the user interaction with a request to move a rendered vector drawing segment based on the selection of a dragging tool or a modifier input.

As mentioned above, a user may desire to move a vector drawing segment from the edge for which the vector drawing segment was generated to another edge in the raster image. Accordingly, while the image transformation system is moving the vector drawing segment in the raster image, the image transformation system detects other edges in the raster image. For instance, as described above, the image transformation system uses the edge map to detect edges and generates pixel lines. When the selected vector drawing segment moves near another edge in the raster image, the image transformation system can emphasize (e.g., highlight or "light up") the edge by rendering a corresponding pixel line as an overlay, as described above.

While showing a pixel line over the raster image (and maintaining the selection of the vector drawing segment), the image transformation system detects the user interaction releasing the selection of the vector drawing segment. In response, in one or more embodiments, the image transformation system removes the selected vector drawing segment and renders a new vector drawing segment to the pixel line (e.g., fits or re-fits) over the new edge of the raster image such that it appears to the user that the selected pixel line moved edges in the raster image.

Figure 5A:
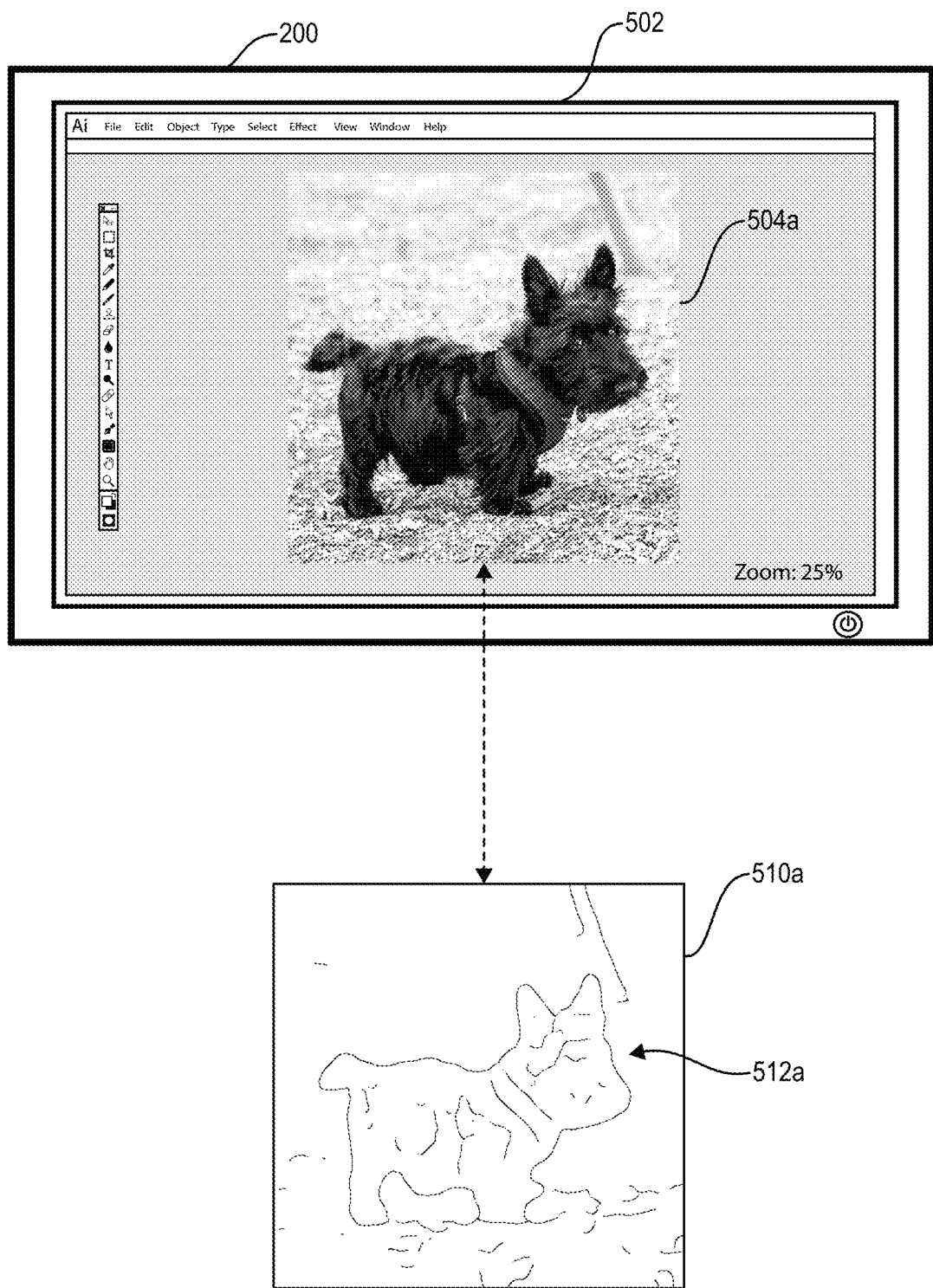
FIGS. 5A-5B illustrate modifying the edge detection intensity of an edge map based on zoom levels of a graphical user interface in accordance with one or more embodiments.
Figure 5B:
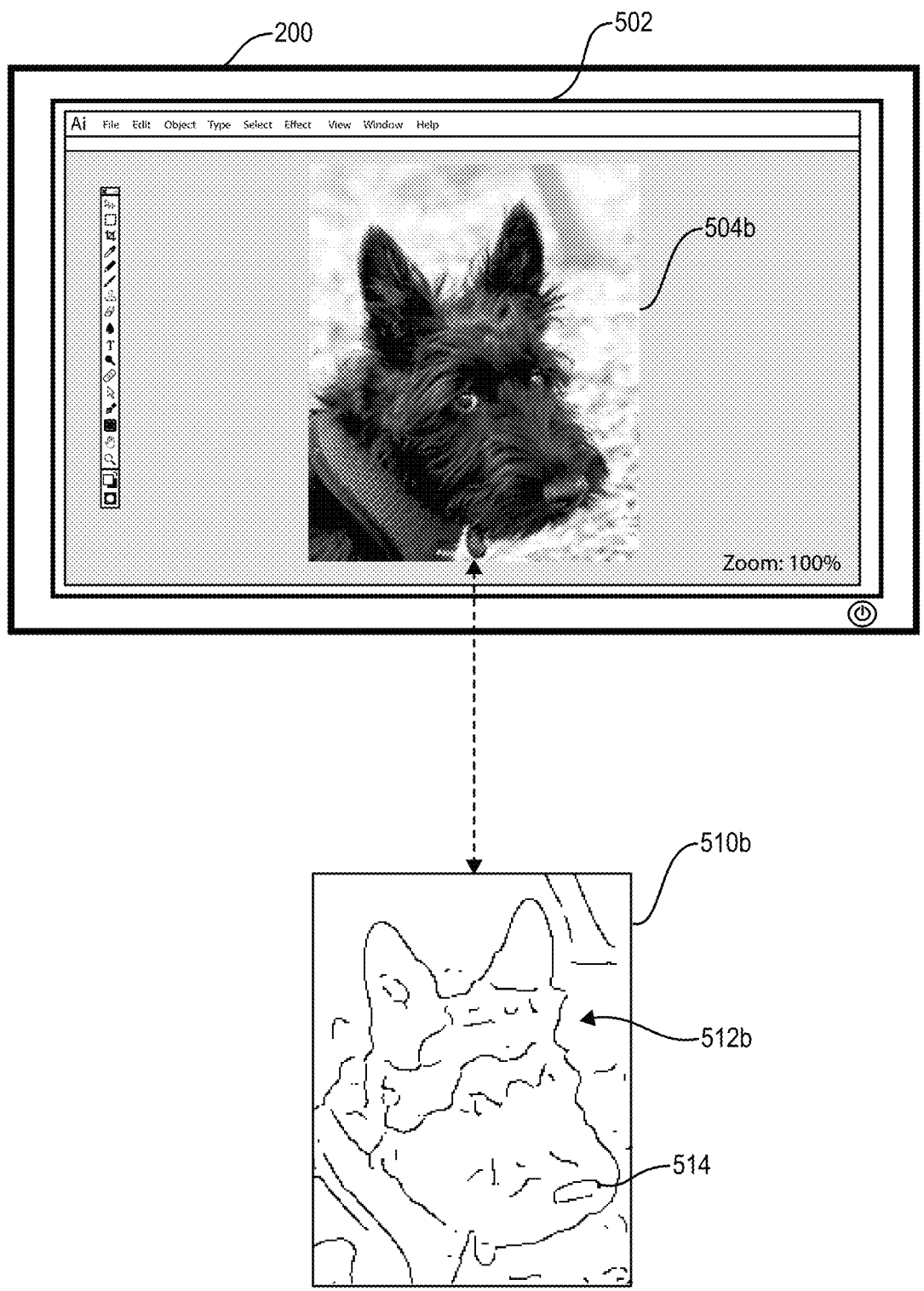

Turning now to the next figure, additional detail is provided regarding scale-dependent generation of enhanced digital images from raster images. In particular, FIGS. 5A-5B illustrate modifying the edge detection (and pixel line generation) intensity of an edge map based on zoom levels of a graphical user interface in accordance with one or more embodiments. As shown, FIGS. 5A-5B includes the client device 200 having a graphical user interface 502, which can represent one or more client devices described previously. For instance, an image editing system or the image transformation system can render the graphical user interface 502.

As shown, the graphical user interface 502 includes a zoomed-out raster image 504a at a first zoom level (e.g., 25% zoom). In connection with the zoomed-out raster image 504a, FIG. 5A includes a zoomed-out edge out 510a. As mentioned above, while the image transformation system generates and utilizes edge maps to detect edges within a raster image and to generate pixel lines, in many embodiments, the edge map is hidden from a user. Accordingly, the zoomed-out edge out 510a is not shown within a graphical user interface.

As shown in the zoomed-out edge out 510a, the image transformation system detects a lower density of detected edges in zoomed-out raster image 504a. For instance, the image transformation system detects the outer edge 512a of the dog shown in the zoomed-out raster image 504a. The image transformation system also detects other prominent edges in the raster image 504b. Indeed, at 25% zoom, the zoomed-out edge out 510a is sub-sampled number of pixels, and, thus, implicitly filtered, resulting in smoothed out detected edges.

The image transformation system can provide various tools or features enabling the user to increase the density of detected edges in an edge map. For example, in one or more embodiments, the image transformation system correlates the density of detected edges in an edge map to the zoom-level of a raster image. To illustrate, FIG. 5B shows an un-zoomed raster image 504b (e.g., 100% zoom) and corresponding un-zoomed edge map 510b.

As shown in FIG. 5B, the un-zoomed edge map 510b includes detected edges not included in the un-zoomed 510a of FIG. 5A. For example, the outer edge 512a of the dog shown in the zoomed-out edge out 510a of FIG. 5A becomes multiple shorter and more detailed detected edges (i.e., the zoomed outer edge 512b) in the un-zoomed edge map 510b of FIG. 5B. In addition, the un-zoomed edge map 510b includes additional detected edges 514 not included in the zoomed-out edge out 510a. Indeed, when the raster image is scaled up to 100%, the image data (e.g., pixels) lost to sub-sampling at the zoomed-out level (e.g., 25% zoom) is restored, resulting in more detailed edges.

In various embodiments, the image transformation system generates a new edge map for the different zoom levels using the same edge detection parameters based on the different sampling densities. In one or more embodiments, the user can provide inputs to the image transformation system to modify the edge detection parameters. In some embodiments, the zoom level must change by a threshold level (e.g., 5%) before the image transformation system generates a new edge map.

By correlating the density of detected edges in an edge map to the zoom-level of a raster image, the image transformation system provides a user with a simple way to control the level of detail for pixel lines and generating vector drawing segment. Indeed, the image transformation system provides a user with pixel lines and corresponding vector drawing segments having additional curves and vector controls (e.g., vector controls 218) used for modifying and manipulating a transformed edge.

In one or more embodiments, the image transformation system refits a previously generated vector drawing segment upon a user zooming in on the vector drawing segment and requesting the image transformation system to refit the vector drawing segment to the more-detailed detected edge. For example, after rendering the outer edge 512a and then increasing the zoom level, the image transformation system receives a request to re-fit the vector drawing segment to the zoomed outer edge 512b, or a portion thereof, using the un-zoomed edge map 510b. For instance, the image transformation system detects a user request by the user selecting and tugging on the vector drawing segment when the raster image is at the increased zoomed level. Likewise, if the image transformation system renders a vector drawing segment at the increased zoomed level, based on a detected user request, the image transformation system can re-fit the vector drawing segment to a detected edge at the un-zoomed level, resulting in a new vector drawing segment with less detail.

In some embodiments, the image transformation system correlates the density of detected edges in an edge map to a user-selectable option. For example, the image transformation system provides a graphical (e.g., slider) or textual edge detection density option that indicates the density of detected edges. The image transformation system modifies edge detection parameters based on changes to the edge detection density option.

For example, in additional embodiments, the image transformation system reveals the zoomed-out edge map 510a within the graphical user interface 502 while the user modifies the edge detection density option. In particular, the image transformation system shows all of the detected edges in an overlay over the raster image 504a such that the detected edges brightly contrast with the raster image 504a. Thus, as the user increases or decreases the edge detection density, the image transformation system shows more or fewer detected edges on the raster image 504a. When the user reaches the desired edge density, the image transformation system hides the edge map. In some embodiments, as described above, the image transformation system reveals or hides an edge map based on a user edge map visibility option.

In one or more embodiments, the image transformation system generates an edge map corresponding to a selected area of a raster image. For example, the image transformation system enables the user to employ a rectangular selection, painted mask selection, lasso selection, cropped selection, etc. In additional embodiments, the image transformation system enables user selection of a region defined by vectors. In addition, the image transformation system can generate a higher density of edges for the selected region. For example, rather than detecting edges, or a high density of edges, for the entire raster image, the image transformation system limits edge detection to a selected portion of the raster image, such that computing resources are preserved. In various embodiments, the image transformation system delays generating an edge map for a raster image until user input is received selecting a desired area of a raster image or an indication to detect edges for the entire raster image.

Figure 6:
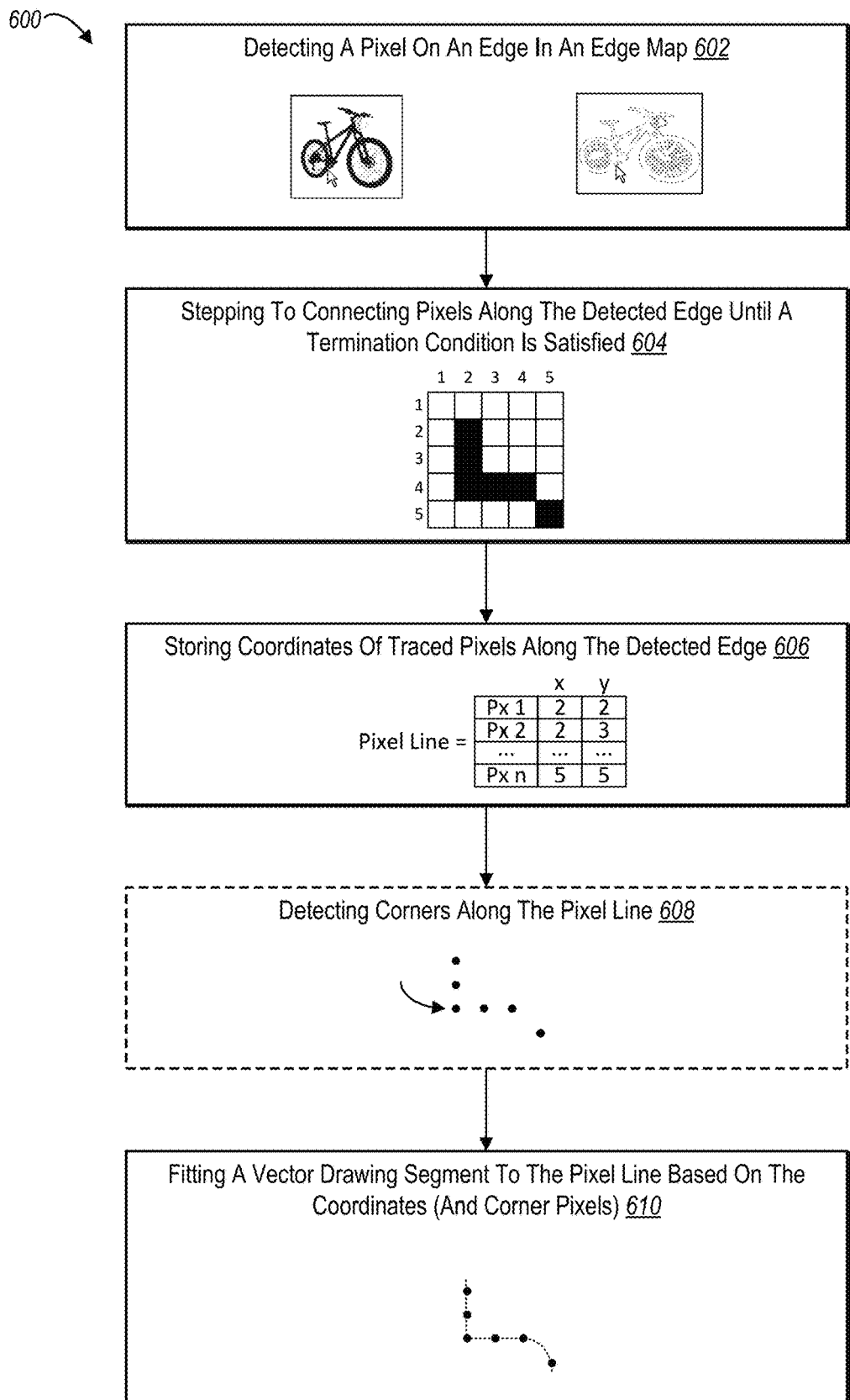
FIG. 6 illustrates generating a pixel line from an edge map based on user interaction with a raster image within a graphical user interface in accordance with one or more embodiments.

Turning now to FIG. 6, additional detail is provided regarding tracing a pixel line within an edge map. FIG. 6 illustrates an overview of generating a pixel line from an edge map based on user interaction with a raster image in a graphical user interface. In various embodiments, the image transformation system performs the series of acts 600. For example, a client device and/or a server device that implements the image transformation system performs the series of acts 600 to generate a pixel line in an edge map.

As illustrated in FIG. 6, the image transformation system performs an act 602 of detecting a pixel on an edge in an edge map. As described previously, the image transformation system maps a user interaction (e.g., cursor movement) with a raster image within a graphical user interface to an edge map. For example, as described above, the image transformation system uses the cursor coordinate of the raster image to determine whether a detected edge exists in the edge map, and a pixel on the detected edge.

In addition, as shown in FIG. 6 the image transformation system performs an act 604 of stepping to connecting pixels along the detected edge until a line termination condition is satisfied. For instance, the image transformation system identifies a second pixel connected to the first pixel, then steps to the second pixel. The image transformation system repeats the process of stepping to connected pixels along the detected edge until a line termination condition is satisfied. Examples of line termination conditions include detecting the no more connecting pixels (e.g., an end of the edge), detecting a pixel split (e.g., an edge spitting into multiple edges), or stepping to the same pixel twice (e.g., the edge loops back on itself).

As further described below, in one or more embodiments, if the first pixel is in the middle of a detected edge, the image transformation system steps in two directions to identify any part of the detected edge that was initially missed. In addition, the image transformation system uses a prioritized approach to efficiently analyze (e.g., step through) a detected edge. For example, in one or more embodiments, the image transformation system prioritizes adjacent pixels relative to diagonal pixels. Indeed, if a given connecting pixel includes an adjacent pixel, and a diagonal pixel, as potential next pixels to step to, in various embodiments, the image transformation system steps to the connecting adjacent pixel above stepping to the diagonal connecting pixel. In alternative embodiments, the image transformation system next steps to the connecting diagonal pixel before stepping to the adjacent connecting pixel. Additional detail regarding prioritizing adjacent pixels over diagonal pixels when stepping along a detected edge is provided below in connection with FIGS. 7A-7C.

As shown in FIG. 6, the image transformation system also performs an act 606 of storing coordinates of traced pixels along the detected edge. For example, the image transformation system stores the pixel coordinates of each pixel identified while stepping along the detected edge. In various embodiments, the image transformation system generates a pixel line by combining the coordinates of the traced pixels. For instance, the image transformation system stores the coordinates in a pixel line table that indicates which pixels are associated with a given pixel line.

Once a pixel line is generated, the image transformation system generates a vector drawing segment, such as a Bézier curve, to the pixel line. As part of generating the vector drawing segment, in some embodiments, the image transformation system performs an optional act 608 of detecting corners along the pixel line. As further described below in connection with FIG. 8, the image transformation system identifies corner pixels in the pixel line, enabling the image transformation system to better vectorize a pixel line.

As shown in FIG. 6, the image transformation system also performs an act 610 of fitting a vector drawing segment to the pixel line based on the coordinates (and corner pixels). For example, the image transformation system generates a Bézier curve based on coordinates stored for the pixel line. If the Bézier curve does not accurately fit the pixel line, the image transformation system splits the pixel line into two portions and refits a Bézier curve to each portion to achieve a more accurate fit, as described below.

In addition, as part of the act 610 of fitting the vector drawing segment to the pixel line, the image transformation system generates and uses cached matrices of Bézier coefficients to improve the efficiency of fitting the pixel line with a vector drawing segment. Additional description regarding cached matrices of Bézier coefficients is provided below in connection with FIG. 9.

Figure 7C:
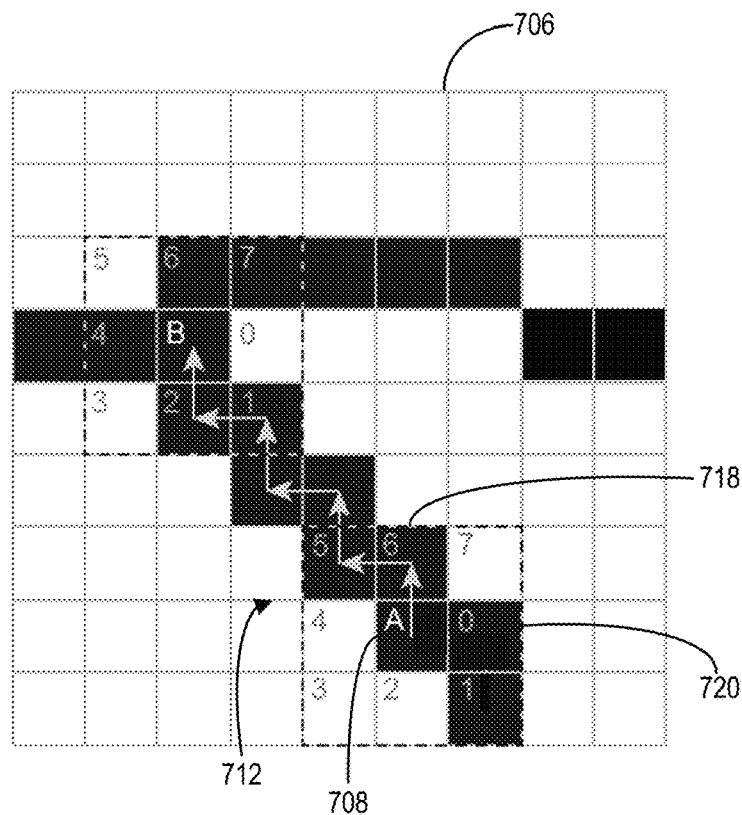

As mentioned above, FIGS. 7A-7C describe the image transformation system utilizing a prioritized approach to efficiently generate a pixel line from a detected edge. In particular, FIGS. 7A-7C illustrate stepping through a detected edge in an edge map to generate a pixel line in accordance with one or more embodiments. As described above, the image transformation system detects an edge within an edge map based on interactions of a user with a raster image within a graphical user interface. Further, as also described above, the image transformation system can render a generated pixel line as an overlay on the raster image within the graphical user interface.

To illustrate, FIG. 7A illustrates an edge map 710 with various detected edges of a raster image (e.g., a mug with a logo). As described above, the image transformation system generates an edge map with single pixel (1-pixel) wide edges, enabling the image transformation system to efficiently generate a pixel line from the edge map. In addition, FIG. 7A shows a pixel grid 706 that includes a detected edge 712.

Moreover, for purposes of explanation, the pixel grid 706 includes a first pixel 708. The first pixel 708 corresponds to the mapped location of a cursor in the raster image, as explained previously. In one or more embodiments, the image transformation system identifies the first pixel 708 by mapping the position coordinates of the cursor in the raster image to the edge map 710. As described below, the image transformation system can start tracing the detected edge 712 from the first pixel 708.

In various embodiments, the image transformation system generates a pixel line from the detected edge 712 by stepping to connecting pixels along the edge from the first pixel 708. Connecting pixels can include adjacent pixels and diagonal pixels of a given pixel. To illustrate, FIG. 7B shows example positions of adjacent pixels 714 and diagonal pixels 716. The adjacent pixels 714 include connecting pixels above, below, left or right of a given pixel. The diagonal pixels 716 are the pixels to the top-left, top-right, bottom-left, or bottom-right of the given pixel.

As shown in FIG. 7B and for explanatory purposes, the image transformation system indexes pixels surrounding a given pixel from 0-8, starting at the right and going clockwise. The image transformation system can also utilize alternative indexing approaches, such as indexing connecting pixels in a counter-clockwise manner, starting at another connecting pixel, or using a combination of letters and numbers to index pixels surrounding a given pixels. Additional examples of indexing include numbering the adjacent pixels 714 before numbering diagonal pixels 716 (or vice versa) or indexing connecting pixels for a given pixel based on stepping direction within the edge map and/or orientation of the detected edge.

Utilizing the adjacent pixels 714 and the diagonal pixels 716 in a prioritized stepping algorithm, the image transformation system can generate a pixel line. To illustrate, FIG. 7C shows the pixel grid 706 mentioned above, including the detected edge 712 and the first pixel 708. As shown, the first pixel 708 is also labeled as "A." As further shown, the first pixel 708 includes pixels indexed (i.e., from 0-8) surrounding the first pixel 708.

In one or more embodiments, upon identifying the first pixel 708, the image transformation system examines connecting pixels along the detected edge 712. By examining the connecting pixels, the image transformation system can verify if there is at least one surrounding pixel to which to step. Further, when multiple connecting pixels are identified, the image transformation system identifies the number of adjacent pixels as well as the number of diagonal pixels.

In general, detected edges in an edge map include more than one pixel. Thus, the image transformation system identifies at least one connecting pixel surrounding the first pixel 708. Otherwise, if no connecting pixels are detected, the image transformation system determines the first pixel 708 is an isolated pixel. If only one connecting pixel is detected, the image transformation system steps to the connecting pixel without further processing. If the first pixel 708 only has a single connecting pixel, the first pixel 708 is one end of the detected edge 712 in the edge map 710.

When the image transformation system determines more than one connecting pixel exists for the first pixel 708, the image transformation system determines which pixel to step to next. In one or more embodiments, as part of determining which pixel to step to next, the image transformation system identifies which of the connecting pixels are the adjacent pixels and which are the diagonal pixels. For example, as shown in FIG. 7C, in the pixel grid 706, the image transformation system identifies two adjacent pixels including a first adjacent pixel at Index 0 (right) and a second adjacent pixel at Index 6 (top). In addition, the image transformation system identifies two diagonal pixels including a first diagonal pixel at Index 1 (bottom-right) and a second diagonal pixel at Index 5 (top-left).

In various embodiments, the image transformation system determines which connecting pixel to step to next based on whether the pixel is an adjacent pixel or a diagonal pixel. For example, in various embodiments, the image transformation system prioritizes the adjacent pixels (Index 0 and 6) over the diagonal pixels (Index 1 and 5). Indeed, if an adjacent pixel and a diagonal pixel connect to a given pixel, the image transformation system steps to the adjacent pixel next. To illustrate, as shown in FIG. 7C, the image transformation system determines to step to one of the adjacent pixels (e.g., the first adjacent pixel at Index 0 or the second adjacent pixel at Index 6) rather than one of the diagonal pixels 716.

The image transformation system continues stepping to connecting pixels until a line termination condition is satisfied. For example, as shown, the image transformation system examines connecting pixels of the second pixel 718 that are along the detected edge 712, identifies the adjacent pixels to the left and bottom as well as diagonal pixels to the top-left and bottom-right, and determines to next step to the adjacent pixel having the higher index (i.e., the left adjacent pixel).

The image transformation system disregards or disqualifies the previously stepped pixel as well as pixels adjacent to the previously stepped pixel as candidates for the next pixel. To illustrate, as described above, the image transformation system steps from the first pixel 708 to the second pixel 718. When determining which pixel to step to next, the image transformation system ignores the first pixel 708 as well as any pixels adjacent to the first pixel (e.g., pixel 720). By ignoring pixels in the previously step direction, the number of connecting pixels in the illustrated detected edge 712 is reduced to one adjacent pixel and one diagonal pixel. Indeed, by ignoring pixels in the previous stepped direction, up to three of the eight connecting pixels are eliminated as candidate pixels to step to next.

As mentioned above, the image transformation system continues stepping along the detected edge 712 by prioritizing adjacent pixels over diagonal pixels and ignoring pixels in the previous step direction until a line termination condition is satisfied. When a line termination condition is satisfied, the image transformation system determines the end of the pixel line is reached and stops stepping along the detected edge 712. One example of a line termination condition is there are no remaining pixels along the detected edge 712 (e.g., the image transformation system cannot step to an adjacent pixel or a diagonal pixel without stepping backward).

A second example of a line termination condition is when the detected edge 712 loops back onto itself. For example, the image transformation system steps to a pixel twice when stepping along the detected edge 712. In this example, the image transformation system cannot step to the previous pixel. Thus, stepping to the same pixel twice indicates the detected edge 712 forms a loop that crosses over or meets back up with itself (e.g., the outline of a raster element).

A third example of a line termination condition is when the image transformation system determines at least three adjacent pixels or at least three diagonal pixels surround a given pixel (including pixels in the previous step direction). When three or more adjacent pixels or diagonal pixels surround a pixel, the detected edge 712 splits or branches into multiple detected edges and the image transformation system stops stepping. In alternative embodiments, the image transformation system continues stepping until one of the previous two line-termination conditions are met.

To illustrate a pixel split line termination condition, FIG. 7C shows the image transformation system stepping from the first pixel 708 (i.e., Pixel A) to Pixel B, as described above. Upon stepping to Pixel B, the image transformation system identifies three adjacent connecting pixels (e.g., bottom, left, and top), which causes the image transformation system to terminate stepping along the detected edge 712 in the current direction.

In one or more embodiments, upon triggering a line termination condition, the image transformation system returns to the first pixel 708 and begins stepping in the opposite direction until a line termination is satisfied in the second direction. For example, the image transformation system starts at the first pixel 708, steps to the right adjacent pixel (i.e., pixel 720 at Index 0), and continues stepping in the second direction until a line termination is satisfied. In this manner, the image transformation system identifies the same pixels along the edge each time regardless of where the stepping process initiates along the detected edge 712.

Additionally, when repeating the stepping process in the second direction, the image transformation system first checks to see if a line termination is satisfied before stepping in the second direction. To illustrate, suppose the image transformation system initially starts at Pixel B as shown in FIG. 7C and steps to the top adjacent pixel and connecting pixels until a line first termination is satisfied (e.g., the first direction). Then, upon returning to Pixel B to step along the detected edge 712 in the second direction, the image transformation system determines that Pixel B satisfies a second line termination condition (e.g., a pixel split), and thus Pixel B is the end of the detected edge.

As just mentioned, the image transformation system may first check to see if a line termination is satisfied before stepping in the second direction. When initially stepping in a first direction (e.g., starting to trace a detected edge from the first pixel), the image transformation system disregards line termination conditions until the pixel line includes at least two pixels. Indeed, if the first pixel is at the end of a detected edge, the image transformation system generates a pixel line by stepping from a first end of the detected edge to a second edge.

While example approaches to selecting a next pixel to step to along the detected edge 712 are provided above, the image transformation system can use alternative approaches and/or variations to the above approaches. For example, in some embodiments, the image transformation system prioritizes diagonal pixels over adjacent pixels.

Upon analyzing the detected edge 712 by stepping along the connected pixels from the first pixel 708, the image transformation system adds the first pixel 708 and the connecting pixels to a pixel line. For example, in one or more embodiments, the image transformation system identifies the x, y coordinates of each pixel stepped to and records the coordinates of each of the pixels in a table or bitmap associated with the pixel line.

As described above, the image transformation system displays the pixel line within a graphical user interface as an overlay to a raster image. For example, the image transformation system plots the coordinates of the pixels in the pixel line in a bitmap displayed over the raster image. If the image transformation system detects a user interaction selecting the pixel line (e.g., clicks the pixel line with a cursor or provides touch input tapping the pixel line), the image transformation system transforms the pixel line into a vector drawing segment. Otherwise, if the user moves the cursor away from the pixel line, the image transformation system hides the overlay that shows the pixel line.

Figure 8:
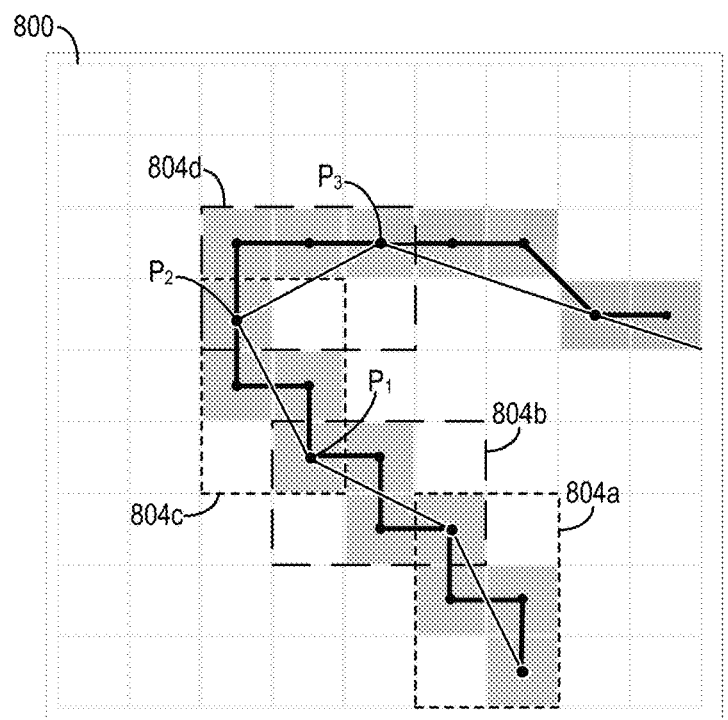
FIG. 8 illustrates detecting a corner pixel within a pixel line in accordance with one or more embodiments.

Before transforming a pixel line into a vector drawing segment, in various embodiments, the image transformation system identifies corner pixels, which the image transformation system uses to better fit Bézier curves to the pixel line. To illustrate, FIG. 8 shows detecting a corner pixel within a pixel line in accordance with one or more embodiments. As shown, FIG. 8 includes a pixel grid 806 having a pixel line 802 (e.g., recorded pixels) identified from a detected edge in an edge map using a stepping process, as described above.

To identify corner pixels that correspond to sharp corners, in one or more embodiments, the image transformation system divides the pixel line 802 into small groups of pixels. As shown in FIG. 8, the image transformation system selects four pixels from the pixel line per group, including pixel groups 804a-804d, where the last pixel in one group overlaps with the first pixel in the next group. In alternative embodiments, the image transformation system selects more or fewer pixels per group and/or does not include overlapping pixels.

Notably, as more pixels are included in a group, the distance between the first and the last pixel increases, and the image transformation system better identifies corner pixels in the group. However, if too many pixels are included in the group, the image transformation system may misidentify corner pixels. Ideally, the image transformation system selects a group of pixels between three and ten pixels (i.e., [3-8]), although the image transformation system can select more pixels (e.g., based on user input via a user-selectable option).

To identify a corner pixel, the image transformation system creates line segments for each of the pixel groups. For example, FIG. 8 shows a line segment connecting pixels in the first pixel group 804a, the second pixel group 804b, the third pixel group 804c, and the fourth pixel group 804d. As shown, because the pixel groups include overlapping pixels, the line segments connect to each other between the pixel groups. In one or more embodiments, the image transformation system determines two adjoining line segments at one time before determining additional line segments.

Using two adjoining line segments, in various embodiments, the image transformation system determines the presence of a corner pixel by comparing the curvature between the two adjoining line segments and determining if the curvature exceeds a corner curvature threshold. In some embodiments, the image transformation system computes and compares the Menger curvature of each pair of line segments.

To illustrate, the image transformation system selects the first endpoint of a first line segment as $p_1$ and the second endpoint of the first line segment as $p_2$, as shown in FIG. 8 with respect to the third pixel group 804c. Further, the image transformation system selects the first endpoint of a second line segment as $p_2$ and the second endpoint of the second line segment as $p_3$, as shown in FIG. 8 with respect to the fourth pixel group 804d. Notably, because the second endpoint of the first line segment and the first endpoint of a second line segment are the same pixel, both are marked as $p_2$. Indeed, $p_2$ represents the joint between the first line segment and the second line segment.

Next, using the three points (i.e., $p_1$, $p_2$, and $p_3$), in various embodiments, the image transformation system determines the curvature (i.e., k) of the line segment pair. If the curvature k exceeds a curvature value (e.g., if k>0.35 for a four-pixel line segment), then the image transformation system assigns the midpoint $p_2$ as a corner pixel. Because the pixel groups include a small number of pixels, assigning a corner pixel that is one or two pixels off from a true corner pixel will provide the same level of enhancement and accuracy when fitting Bézier curves to corner pixels of a pixel line.

To illustrate, the following Equations provides formulas for determining the curvature k of a line segment pair.

$$D_{12} = \sqrt{(p_{2_x} - p_{1_x})^2 + (p_{2_y} - p_{1_y})^2} \quad (1)$$

$$D_{23} = \sqrt{(p_{3_x} - p_{2_x})^2 + (p_{3_y} - p_{2_y})^2} \quad (2)$$

$$D_{13} = \sqrt{(p_{3_x} - p_{1_x})^2 + (p_{3_y} - p_{1_y})^2} \quad (3)$$

-continued $$\overline{D} = \frac{D_{12} + D_{23} + D_{13}}{3} \quad (4)$$

$$k = \frac{\overline{D}(|p_{1_x} - p_{3_x}| * |p_{2_y} - p_{1_y}| - |p_{1_x} - p_{2_x}| * |p_{3_y} - p_{1_y}|)}{D_{12} * D_{23} * D_{13}} \quad (5)$$

As shown in Equations 1-5, the image transformation system determines the curvature k based on the three points (i.e., $p_1$, $p_2$, and $p_3$) across the two adjoining line segments. In Equations 1-3, the image transformation system employs square roots to normalize the distance such that the scale of the group of pixels does not adversely affect the curvature calculation.

FIGS. 7A-7C and FIG. 8 described various embodiments of generating a pixel line in an edge map. Accordingly, the actions and algorithms described in connection with FIGS. 7A-7C and FIG. 8 provide an example structure for performing a step for determining a pixel line for an edge based on user interaction, the edge map of the raster image, and a prioritized stepping algorithm.

Based on the above description, the image transformation system marks the corner pixels in the pixel line. For example, the image transformation system sets a flag next to each corner pixel in a pixel line table or bitmap that stores the coordinates of each pixel in a pixel line. Then, using the endpoints and the corner pixels of the pixel line, the image transformation system accurately transforms the pixel line into a vector drawing segment, as detailed below.

To illustrate, the image transformation system initially fits a Bézier curve to a pixel line based on the endpoints of the pixel line as well as various pixels along the line (before a corner detection algorithm is used).

In one or more embodiments, upon initially fitting a Bézier curve to the pixel line, the image transformation system measures the accuracy of the fit. For example, the image transformation system compares the distance between points along the pixel line to the initial Bézier curve to determine if the distance is greater than a distance threshold. If the distance between a pixel on the pixel line and the initial Bézier curve exceeds the distance threshold, the image transformation system subdivides the pixel line and re-fits the line with an additional Bézier curve. The image transformation system repeats the process of measuring and subdividing until a smooth curve segment is created (i.e., the vector drawing segment).

In one or more embodiments, the image transformation system fits a Bézier curve to a pixel line using a Bézier curve fitting algorithm. For example, the image transformation system utilizes a least-squares fitting method to compute an optimal curve representation for the smooth segment of pixel line coordinates, as described in Boem et. al., "A Survey of Curve and Surface Methods in CAGD", Computer Aided Geometric Design, volume 1, issue 1, July 1984, p. 21, which is incorporated herein by reference in its entirety.

The image transformation system generates Bézier curves for each group of pixels between end points (including corner pixels and additionally added end points) using a Bézier curve fitting algorithm. For example, in one or more embodiments, the image transformation system employs the following formula to approximate a Bézier curve segment from the sample points in a pixel line, as shown in Equation 6.

$$P = (B^T B)^{-1} * (B^T S) \quad (6)$$

In Equation 6, P represents the control points for a Bézier curve, and S represents n pixel coordinates (e.g., the number of pixels sample points) in the pixel line or a portion of a pixel line being fitted with a Bézier curve. In addition, B represents a matrix of cubic Bézier coefficients for equally spaced points and is defined as follows $$u_i = \frac{i}{n-1} \quad (7)$$

$$B_j(u) = \frac{6}{j!(3-j)!} u^j (1-u)^{3-j} \quad (8)$$

$$B_{i,j} = B_j(u_i) \quad (9)$$

As shown in Equations 6-9, the image transformation system fits a Bézier curve to a pixel line using a least-squares fitting method by using a matrix of cubic Bézier coefficients, where j is 0.3.

In addition, because the image transformation system employs a uniform stepping amount (e.g., 1-pixel wide edges), the matrices of Bézier coefficients (i.e., $B^T$ and $(B^T B)^{-1}$) are constant for pixel lines having the same number (i.e., n) of pixels. For example, if the image transformation system identifies multiple pixel lines that are 5-pixel long, the image transformation system generates the Bézier coefficients matrix once and reuses the Bézier coefficient matrix to fit a Bézier curve to each subsequent pixel line of five pixels, even if each of the pixel lines vary in direction, shape, or curvature.

Figure 9:
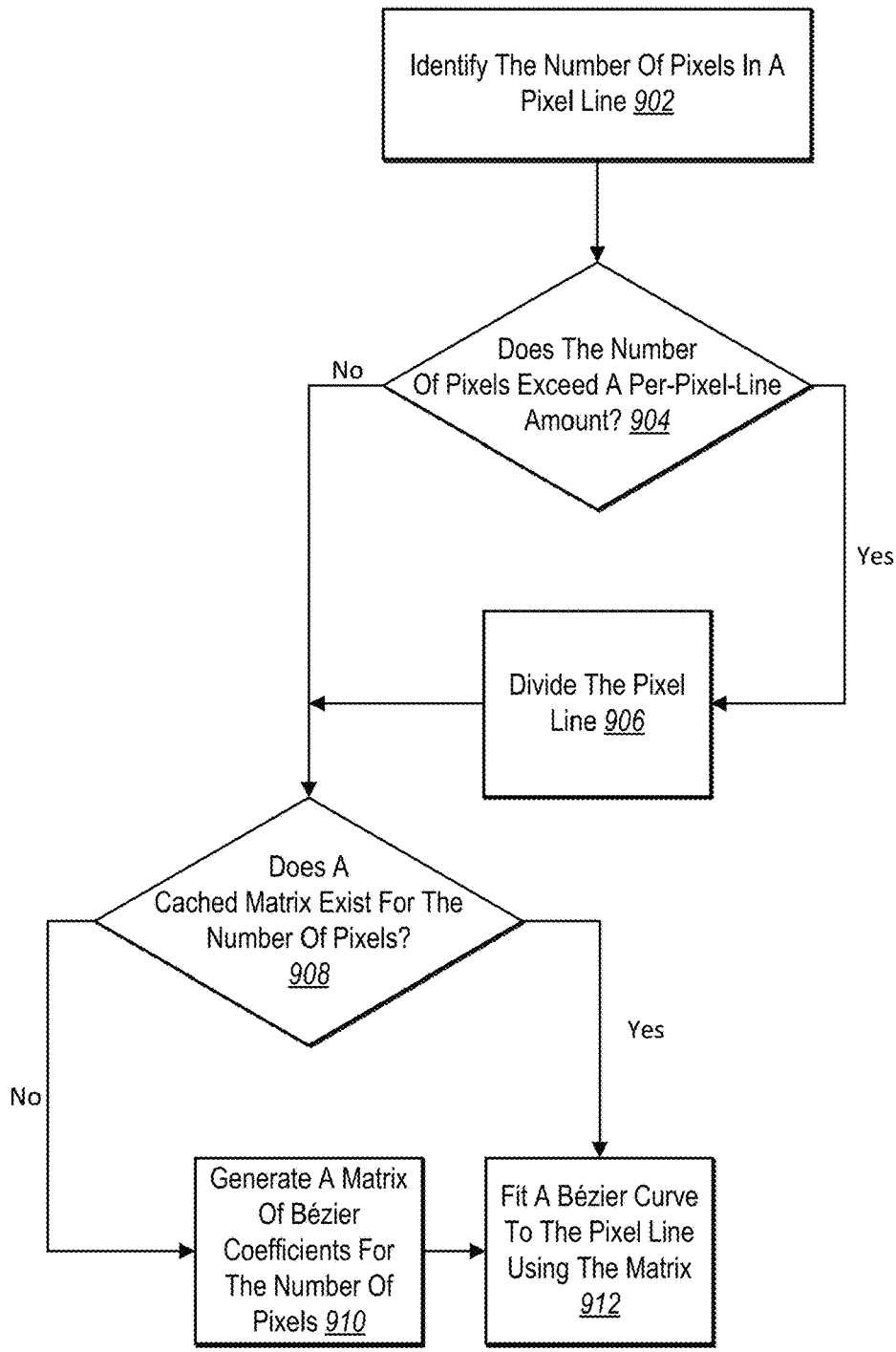
FIG. 9 illustrates caching a Matrix of Bézier coefficient used to fit a Bézier curve to a pixel line in accordance with one or more embodiments.

To further illustrate, FIG. 9 shows a flow chart of a series of acts 900 for caching a matrix of Bézier coefficients used to fit a Bézier curve to a pixel line in accordance with one or more embodiments. For example, the image transformation system follows the series of acts 900 when fitting a Bézier curve to a pixel line.

As shown in FIG. 9, the image transformation system performs an act 902 of identifying the number of pixels in a pixel line. For example, the image transformation system counts the number of pixels in a pixel line (or a subpart of a pixel line). The image transformation system counts the number of pixels between two marked endpoints, including corner pixels.

In addition, as illustrated in FIG. 9 the image transformation system performs an act 904 of determining whether the number of pixels exceeds a pixel-per-line amount. For example, if the image transformation system determines the number of pixels in the pixel line exceeds the pixel-per-line amount, the image transformation system divides the pixel line (i.e., by preforming an act 906) until each divided pixel line is below the pixel-per-line amount. The image transformation system then treats each divided pixel line as a separate pixel line. Further, if the image transformation system divides a pixel line by a factor of two, the image transformation system reuses the Bézier coefficient matrix for each divided pixel line, as described below.

Indeed, by setting a pixel-per-line limit, the image transformation system reduces the computational requirements needed by a client device to generate a large Bézier coefficient matrix as well as the storage space needed to store a large Bézier coefficient matrix. Indeed, as the number of pixels in a pixel line increases, the size and complexity of a corresponding Bézier coefficients matrix exponentially grow. Thus, by limiting the number of pixels in a pixel line to a pixel-per-line amount (e.g., 50, 100, 500, or 1000 pixels), and dividing larger pixel lines, the image transformation system reduces overall computer processing by using less complex Bézier coefficient matrices, and in many cases, re-using a previously computed Bézier coefficient matrix.

When the number of pixels in the pixel line is below the pixel-per-line amount, the image transformation system determines whether a cached matrix exists for the number of pixels in the pixel line, as shown in an act 908. For example, the image transformation system compares the number of pixels in the pixel line to a database of cached Bézier coefficient matrices to determine if a Bézier coefficient matrix for the given number of pixels was previously generated by the image transformation system.

If the image transformation system identifies a cached Bézier coefficient matrix corresponding to the number of pixels in the pixel line, the image transformation system fits a Bézier curve to the pixel line using the matrix, as shown in an act 912. By using a cached Bézier coefficients matrix, the image transformation system need only apply simple arithmetic (e.g., multiplication and addition loops) rather than undergoing the complex process of generating a duplicative Bézier coefficient matrix.

Otherwise, the image transformation system generates a matrix of Bézier coefficients for the number of pixels in the pixel line, as shown in an act 910. Upon generating the Bézier coefficient matrix for the number of pixels in the pixel line, in various embodiments, the image transformation system stores or caches the Bézier coefficient matrix in the database of Bézier coefficient matrices. In some embodiments, the database is stored on a client device and erased after an elapsed time or a trigger event (e.g., the user closes the vector drawing and/or an image editing program).

Figure 10:
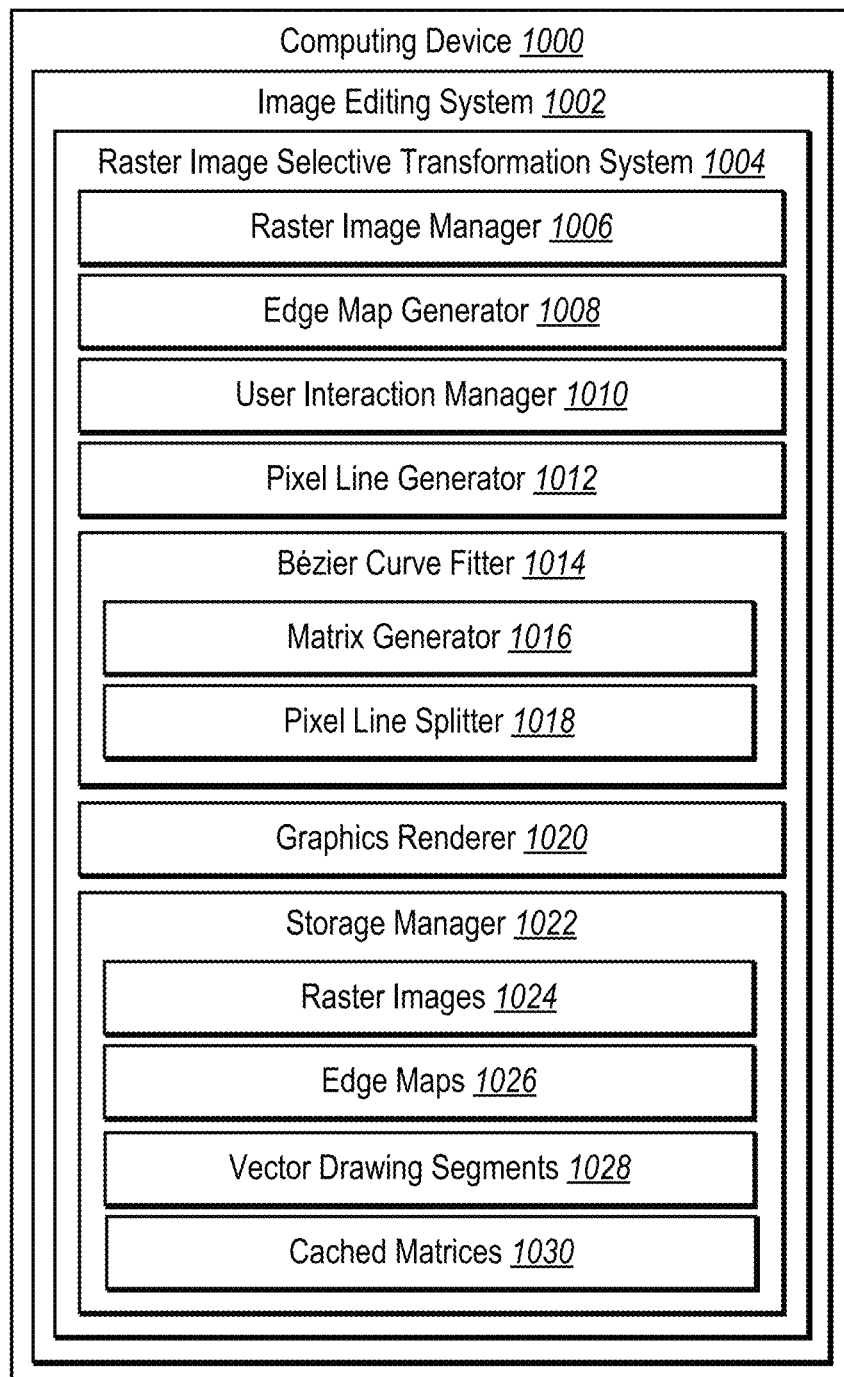
FIG. 10 illustrates a schematic diagram of the raster image selective transformation system in accordance with one or more embodiments.

Turning now to FIG. 10, additional detail is provided regarding capabilities and components of the image transformation system in accordance with one or more embodiments. In particular, FIG. 10 shows a schematic diagram of a computing device 1000 that includes an image editing system 1002 and a raster image selective transformation system 1004 (i.e., an exemplary implementation of the image transformation system described above). In one or more embodiments, some or all the components of the raster image selective transformation system 1004 (or simply "image transformation system 1004") are implemented separately from the image editing system 1002. Moreover, the computing device 1000 includes a variety of different devices. For example, in some embodiments, some or all the components of the image transformation system 1004 are implemented on a client device and/or server device.

As shown, the image transformation system 1004 is located on a computing device 1000 within an image editing system 1002. In general, the computing device 1000 represents various types of client devices. For example, in some embodiments, the client is a mobile device, such as a laptop, a tablet, a mobile telephone, a smartphone, etc. In other embodiments, the computing device 1000 is a non-mobile device, such as a desktop or server, or another type of client device. Additional details regarding the computing device 1000 are discussed below as well as with respect to FIG. 14.

The image editing system 1002, in general, facilitates the creation, modification, sharing, and/or deletion of digital images within applications. For example, the image editing system 1002 provides a variety of tools on the computing device 1000 related to image creating and editing (e.g., image drawing, editing, and vectorization). In addition, the image editing system 1002 accesses additional locally or remotely stored repositories of raster images. Further, in some embodiments, the image editing system 1002 is located separately from the computing device 1000 (e.g., on a server device) and communicate with the image transformation system 1004.

Moreover, the image editing system 1002 operates in connection with one or more applications to facilitate the vectorization of raster images on the computing device 1000. For example, in one or more embodiments, the image editing system 1002 includes multiple applications, functions, and operations relating to graphical content, such as an application suite, a web-based application and/or system operation on the computing device 1000.

As shown, the image transformation system 1004 in FIG. 10 includes various components for performing the processes and features described herein. For example, the image transformation system 1004 includes a raster image manager 1006, an edge map generator 1008, a user interaction manager 1010, a pixel line generator 1012, a Bézier curve fitter 1014, a graphics renderer 1020, and storage manager 1022. Each of these components is further described below.

As just mentioned, the image transformation system 1004 includes the raster image manager 1006. In general, the raster image manager 1006 facilitates identifying, accessing, receiving, obtaining, generating, importing, exporting, copying, modifying, removing, and/or organizing raster images. In one or more embodiments, the raster image manager 1006 operates in connection with the image editing system 1002 to access and load raster images. Further, as shown, the raster image manager 1006 communicates with the storage manager 1022 to store and/or access raster images 1024.

As also shown, the image transformation system 1004 includes an edge map generator 1008. For example, in one or more embodiments, the edge map generator 1008 creates, generates, and/or detects an edge map for a raster image or a portion thereof. In some embodiments, the edge map generator 1008 generates an edge map by detecting edges in the raster image based on edge detection parameters and/or pixel sampling densities where the edges are one pixel wide, as explained earlier. In various embodiments, the edge map generator 1008 employs Canny edge detection to detect edges in a raster image. Further, as shown, the edge map generator 1008 communicates with the storage manager 1022 to store and/or access edge maps 1026.

As illustrated in FIG. 10, the image transformation system 1004 includes the user interaction manager 1010. In one or more embodiments, the user interaction manager 1010 detects, identifies, receives, recognizes, and/or interprets interactions by a user. The user interaction manager 1010 detects user interactions within a graphical user interface, as described previously. As mentioned above, user interactions include movements, clicks, drags, selections, or deselections with a cursor or touch input.

In some embodiments, the user interaction manager 1010 communicates with the edge map generator 1008 by providing coordinates of a user interaction to the edge map generator 1008. For example, as a user moves a cursor over a raster image within a graphical user interface, the user interaction manager 1010 provides the coordinates to the edge map generator 1008, as previously described. Similarly, in various embodiments, when the user interaction manager 1010 detects a user interaction, such as the user selecting a pixel line, the user interaction manager 1010 provides an indication of the pixel line selection to the Bézier curve fitter 1014.

As shown, the image transformation system 1004 includes the pixel line generator 1012. In general, the pixel line generator 1012 receives a position (e.g., coordinates) of a user interaction with a raster image and identifies a pixel edge based on the user interaction, as explained earlier. In addition, the pixel line generator 1012 generates a pixel line by stepping from a pixel on the detected edge to connecting pixels using a prioritized stepping function, as described previously.

As illustrated, the image transformation system 1004 also includes the Bézier curve fitter 1014 having a matrix generator 1016 and a pixel line splitter 1018. In general, the Bézier curve fitter 1014 generates a vector drawing segment by fitting one or more Bézier curves to a pixel line, as described previously. For example, in some embodiments, the Bézier curve fitter 1014 uses a Bézier curve fitting algorithm to fit a Bézier curve to a pixel line. As shown, the Bézier curve fitter 1014 communicates with the storage manager 1022 to store and access the vector drawing segment generated for a pixel line.

As mentioned, the Bézier curve fitter 1014 includes the matrix generator 1016 and the pixel line splitter 1018. In one or more embodiments, the matrix generator 1016 generates and caches matrices of Bézier coefficients, used by the Bézier curve fitter 1014 to fit a Bézier curve to a pixel line. As described above, a Bézier coefficient matrix corresponds to a particular number of pixels in a pixel line, and the Bézier curve fitter 1014 reuses the same Bézier coefficients matrix multiple times for pixel lines having the same number of pixels. As shown, the matrix generator 1016 communicates with the storage manager 1022 to store and access the cached matrices 1030.

In some embodiments, the pixel line splitter 1018 detects when a Bézier curve does not closely fit a pixel line. For example, the pixel line splitter 1018 determines the distance between a pixel on the pixel line and an initially fit Bézier curve exceeds a distance threshold. When the pixel line splitter 1018 detects the distance threshold is exceeded, the pixel line splitter 1018 splits the pixel line into two segments, and refits Bézier curves to each of the pixel lines.

As shown, the image transformation system 1004 also includes a graphics renderer 1020. In general, the graphics renderer 1020 provides and/or renders one or more graphical user interface displaying raster images. In addition, the graphics renderer 1020 provides and/or renders overlays including pixel lines and/or vector drawing segments. For example, the graphics renderer 1020 provides and/or renders an image layer of a vector drawing including one or more vector drawing segments transformed from edges in a raster image, as described above.

The components 1006-1030 of the image transformation system 1004 includes software, hardware, or both. For example, the components 1006-1030 include one or more instructions stored on a computer-readable storage medium and executable by processors of one or more computing devices, such as a client device or server device. When executed by the one or more processors, the computer-executable instructions of the image transformation system 1004 can cause the computing device(s) to perform the feature learning methods described herein. Alternatively, the components 1006-1030 can include hardware, such as a special-purpose processing device to perform a certain function or group of functions. Alternatively, the components 1006-1030 of the image transformation system 1004 can include a combination of computer-executable instructions and hardware.

Furthermore, the components 1006-1030 of the image transformation system 1004 are, for example, implemented as one or more operating systems, as one or more stand-alone applications, as one or more modules of an application, as one or more plug-ins, as one or more library functions or functions called by other applications, and/or as a cloud-computing model. Thus, the components 1006-1030 can be implemented as a stand-alone application, such as a desktop or mobile application. Furthermore, the components 1006-1030 can be implemented as one or more web-based applications hosted on a remote server. The components 1006-1030 can also be implemented in a suite of mobile device applications or "apps." To illustrate, the components 1006-1030 can be implemented in an application, including but not limited to ADOBE® ILLUSTRATOR®, ADOBE PHOTOSHOP®, and ADOBE® AFTER EFFECTS® software. "ADOBE," "ILLUSTRATOR," "PHOTOSHOP," and "AFTER EFFECTS" are either registered trademarks or trademarks of Adobe Systems Incorporated in the United States and/or other countries.

Figure 11:
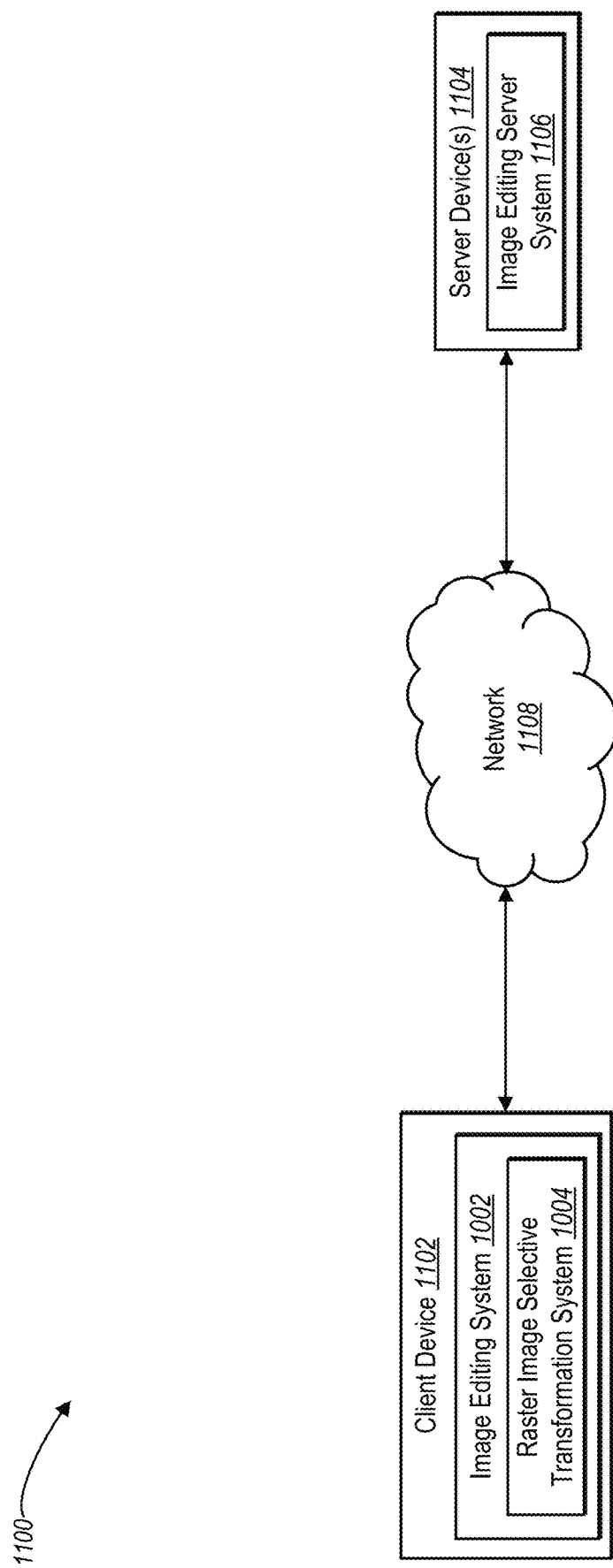
FIG. 11 illustrates a schematic diagram of an exemplary environment in which the raster image selective transformation system is implemented in accordance with one or more embodiments.

FIG. 11 illustrates a schematic diagram of an environment 1100 in which the raster image selective transformation system 1004 (or simply "image transformation system 1004") may be implemented in accordance with one or more embodiments. In one or more embodiments, the environment 1100 includes various computing devices including a client device 1102 and server device(s) 1104. In addition, the environment 1100 includes a network 1108. The network 1108 may be any suitable network over which the computing devices can communicate. Example networks are discussed in more detail below with regard to FIG. 14.

As illustrated in FIG. 11, the environment 1100 includes the client device 1102. The client device 1102 may comprise any computing device, such as the computing device described below in relation to FIG. 14. As shown, the client device includes the image editing system 1002 and the image transformation system 1004, which are described previously. For example, as described above, the image transformation system 1004 transforms edges in a raster image into vector drawing segments based on user interactions and user selections. Further, the image transformation system 1004 employs a prioritized stepping algorithm to generate pixel lines, which the image transformation system 1004 uses to transform or convert the edge in the raster image into vector drawing segments, as explained earlier.

In addition, the environment 1100 includes the server device(s) 1104, which may comprise any computing device, such as one or more of the computing devices described below in relation to FIG. 14. The server device(s) 1104 can generate, store, receive, and transmit any type of data, including graphical content such as raster images, pixel lines, and/or vector drawing segments. As shown, the server device(s) 1104 includes an image editing server system 1106 that communicates with the image editing system 1002 on the client device 1102. For example, the image editing server system 1106 transmits graphical content to the client device 1102, which enables the client device 1102 to render pixel lines and/or vector drawing segments within a graphical user interface of the client device 1102. Notably, while only a single server device is shown, the image editing server system 1106 can be implemented across multiple server devices.

While not illustrated, in one or more embodiments, the server device(s) 1104 can also include all, or a portion of, the image transformation system 1004, such as within the image editing server system 1106. For example, when located in the server device(s) 1104, the image transformation system 1004 can comprise an application running on the server device(s) 1104 or a portion of a software application that can be downloaded to the client device 1102. For instance, the image transformation system 1004 includes a web hosting application allowing the client device 1102 to interact with content from the image editing server system 1106 hosted on the server device(s) 1104. In this manner, the server device(s) 1104 generates a pixel line and/or a vector drawing segment based on user interaction within a graphical user interface provided to the client device 1102.

Although FIG. 11 illustrates a particular arrangement of the server device(s) 1104, the client device 1102 and the network 1108, various additional arrangements are possible. For example, while FIG. 11 illustrates the one or more client device 1102 communicating with the server device(s) 1104 via the network 1108, in one or more embodiments a single client device may communicate directly with the server device(s) 1104, bypassing the network 1108.

Similarly, although the environment 1100 of FIG. 11 is depicted as having various components, the environment 1100 may have additional or alternative components. For example, the image transformation system 1004 can be implemented on multiple computing devices. In particular, the image transformation system 1004 may be implemented in whole by the server device(s) 1104 or the image transformation system 1004 may be implemented in whole by the client device 1102. Alternatively, the image transformation system 1004 may be implemented across multiple devices or components (e.g., utilizing the server device(s) 1104 and the one or more client device 1102).

Figure 12:
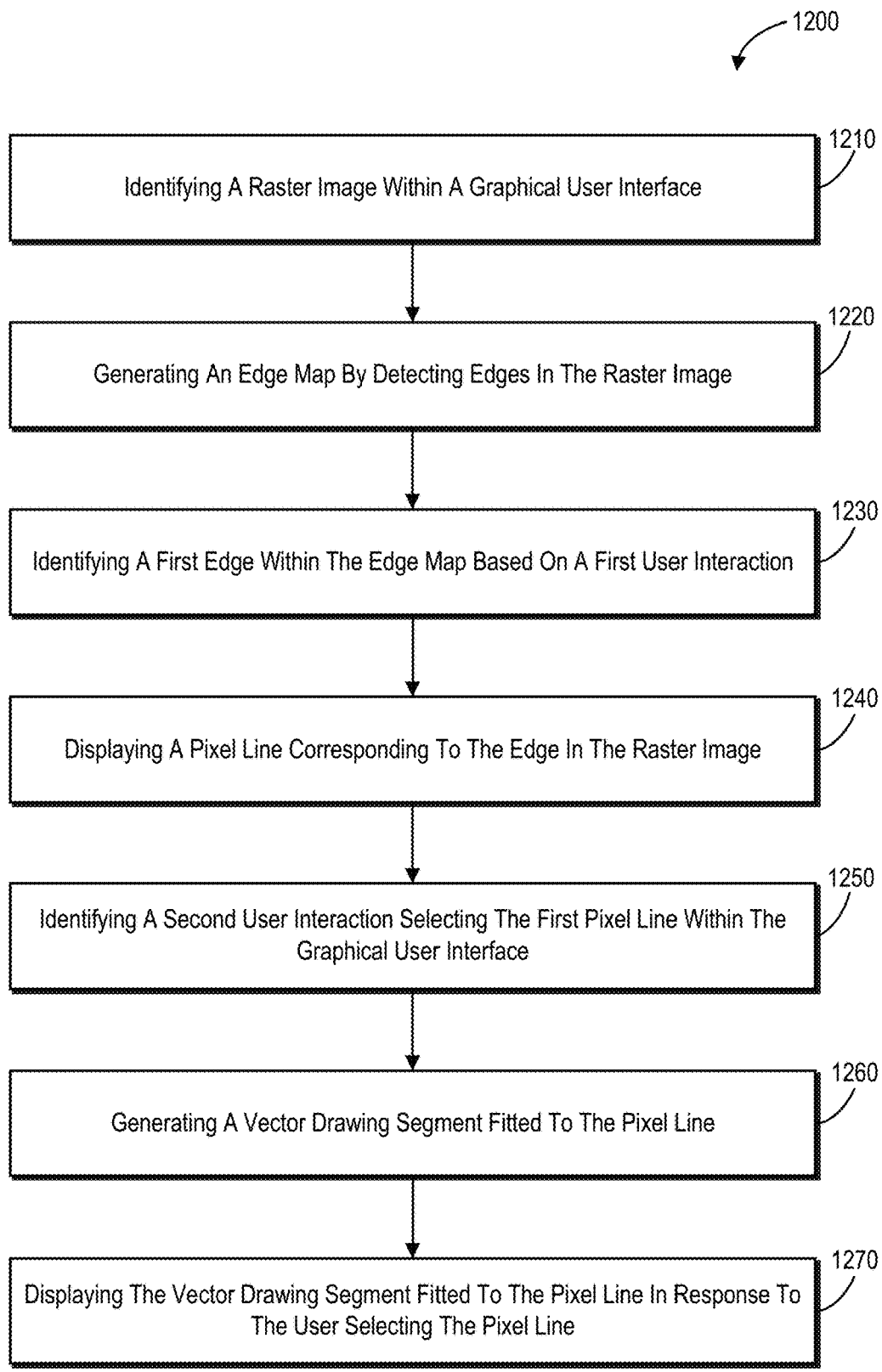
FIG. 12 illustrates a flowchart of a series of acts for generating enhanced digital images by transforming raster images to vector drawings in accordance with one or more embodiments.
Figure 13:
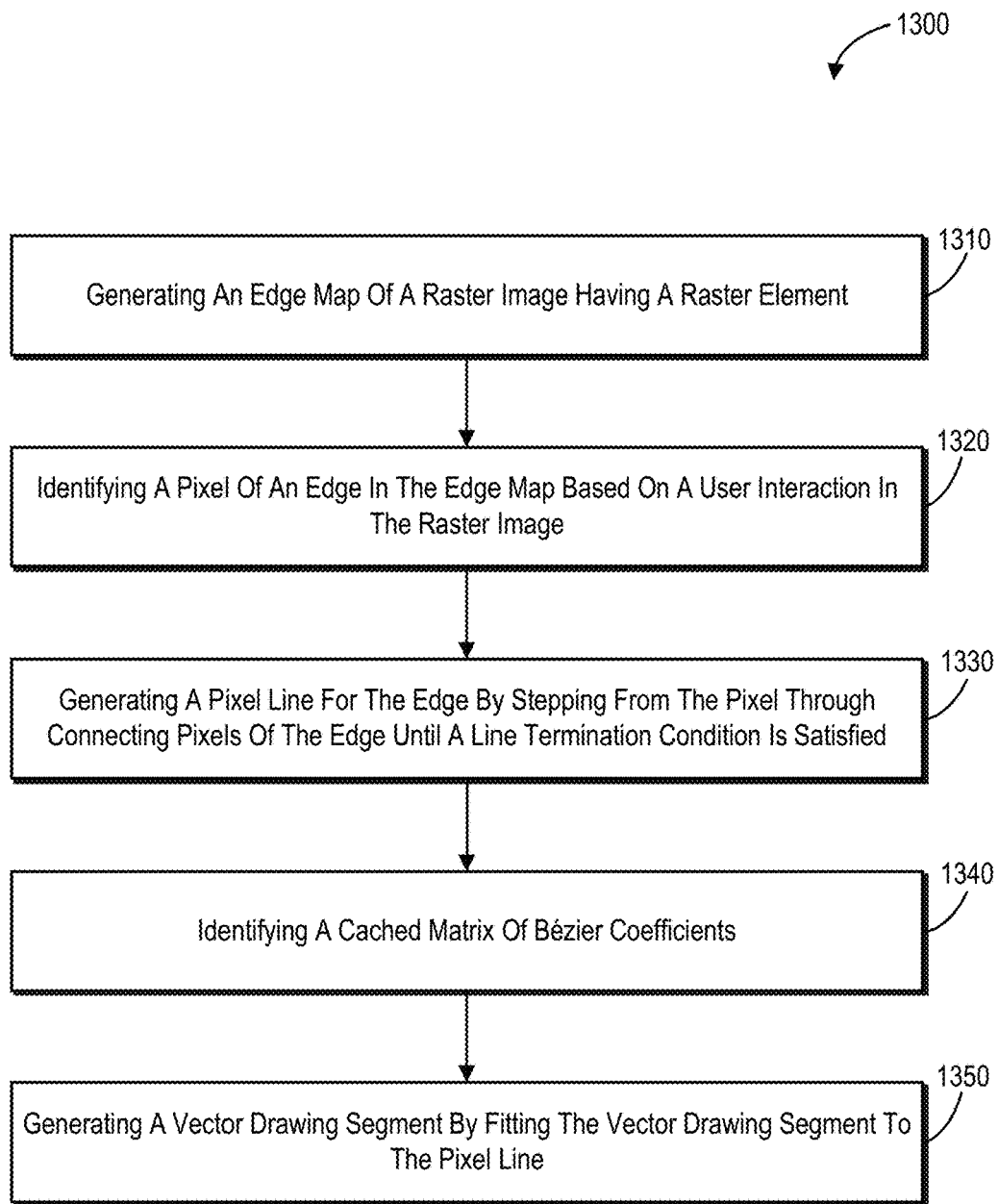
FIG. 13 illustrates a flowchart of a series of acts for efficiently generating enhanced digital images by transforming raster elements in raster images to vector drawing segments in accordance with one or more embodiments.

FIGS. 1-11, the corresponding text, and the examples provide several different systems, methods, techniques, components, and/or devices of the image transformation system 1004 in accordance with one or more embodiments. In addition to the above description, one or more embodiments can also be described in terms of flowcharts including acts for accomplishing a particular result. For example, FIG. 12 and FIG. 13 illustrate flowcharts of an exemplary sequence of acts in accordance with one or more embodiments. In addition, FIG. 12 and FIG. 13 may be performed with more or fewer acts. Further, the acts may be performed in differing orders. Additionally, the acts described herein may be repeated or performed in parallel with one another or parallel with different instances of the same or similar acts.

While FIG. 12 and FIG. 13 illustrate series of acts according to particular embodiments, alternative embodiments may omit, add to, reorder, and/or modify any of the acts shown. The series of acts of FIG. 12 and FIG. 13 can be performed as part of a method. Alternatively, a non-transitory computer-readable medium can comprise instructions, when executed by one or more processors, cause a computing device (e.g., a client device and/or a server device) to perform the series of acts of FIG. 12 and FIG. 13. In still further embodiments, a system performs the acts of FIG. 12 and FIG. 13.

To illustrate, FIG. 12 shows a flowchart of a series of acts 1200 for generating enhanced digital images by transforming raster-based elements in raster images to vector drawing segments in accordance with one or more embodiments. As shown, the series of acts 1200 includes an act 1210 of identifying a raster image within a graphical user interface. The act 1210 involves identifying a raster image within a graphical user interface portraying a raster element. In one or more embodiments, the act 1210 includes receiving or loading the raster image for display in a graphical user interface of a client device. In various embodiments, the raster image includes a raster element having a plurality of edges As shown in FIG. 12, the series of acts 1200 further includes an act 1220 of generating an edge map by detecting edges in the raster image. In particular, the act 1220 involves generating an edge map by detecting a plurality of edges within the raster image displayed on the graphical user interface. In various embodiments, the edge map includes a plurality of detected edges corresponding to the plurality of edges of the raster element in the raster image. Further, in some embodiments, the resolution of the edge map matches the image resolution of the raster image.

The series of acts 1200 also includes an act 1230 of identifying a first edge within the edge map based on a first user interaction. In particular, the act 1230 involves identifying a first edge of the plurality of edges of the raster element within the edge map based on a first user interaction within a graphical user interface displaying the raster image. In some embodiments, the act 1230 also includes identifying the first edge of the plurality of edges of the raster element within the edge map by determining coordinates of the first user interaction within the graphical user interface displaying the graphical user interface and mapping the coordinates of the first user interaction to the edge map to identify the first edge of the plurality of edges of the raster element within the edge map.

As shown, the series of acts 1200 also includes an act 1240 of displaying a pixel line corresponding to the edge in the raster image. In particular, the act 1240 involves generating, for display as a first overlay to the raster element in the raster image within the graphical user interface, a first pixel line corresponding to the first edge in response to the first user interaction. In some embodiments, the first pixel line corresponds to a continuous, non-intersecting portion of the first edge. In various embodiments, the act 1240 involves rendering, within the graphical user interface, a first pixel line as an overlay to a first edge of the plurality of edges in the raster image without generating a Bézier curve corresponding to the first edge.

In addition, in one or more embodiments, the act 1240 includes highlighting the first pixel line in the raster image in response to the first user interaction, where the first pixel line corresponds to an edge of the raster element in the raster image, and where only a single pixel line is displayed over the corresponding edge of the raster element. Further, in some embodiments, the act 1240 includes removing the highlighting of the first pixel line and/or removing the first pixel line based on detecting an additional user interaction away from the corresponding edge of the raster element in the raster image.

As shown in FIG. 12, the series of acts 1200 further includes an act 1250 of identifying a second user interaction selecting the first pixel line within the graphical user interface. In particular, the act 1250 involves identifying a second user interaction within the graphical user interface indicating a selection of the first pixel line. In various embodiments, the act 1250 includes detecting a user selecting the first pixel line while the first pixel line is rendered over the raster image within the graphical user interface.

As shown, the series of acts 1200 also includes an act 1260 of generating vector drawing segment fitted to the pixel line. In particular, the act 1260 involves generating, in response to detecting a user interaction selecting the first pixel line, vector drawing segment (e.g., a Bézier curve) fitted to the first pixel line. In some embodiments, the act 1260 includes delaying fitting the vector drawing segment to the first pixel line until after detection of the second user interaction selecting the first pixel line.

As shown in FIG. 12, the series of acts 1200 further includes an act 1270 of displaying a vector drawing segment fitted to the pixel line in response to the user selecting the pixel line. In particular, the act 1270 involves providing, for display as a second overlay to the raster element in the raster image within the graphical user interface, a vector drawing segment fitted to the first pixel line in response to the second user interaction selecting the first pixel line. Further, in some embodiments, the act 1270 involves rendering the vector drawing segment (e.g., Bézier curve) fitted to the first pixel line together with the raster image within the graphical user interface. In one or more embodiments, the act 1270 includes removing the first overlay having the first pixel line from the user interface prior to providing the second overlay including the vector drawing segment for display.

In one or more embodiments, the series of acts 1200 includes additional acts. For example, in some embodiments, the series of acts 1200 includes the act of connecting vector drawing segments fitted to the different pixel lines together. In addition, the series of acts 1200 can include the acts of visually separating, within the graphical user interface, the vector drawing segment into two portions at a point along the vector drawing segment based on receiving a second user interaction including a selection of the point along the vector drawing segment; identifying, while the selection of the second user interaction is maintained, a first portion of the two portions to remove based on movement information corresponding to the second user interaction; and removing the first portion of the vector drawing segment based on identifying the first portion for removal and detecting an end of the selection.

In various embodiments, the series of acts 1200 includes the acts of identifying a zoom level of the raster image displayed on the graphical user interface; determining pixel densities based on the zoom level of the raster image displayed on the graphical user interface; and generating the edge map based on the pixel densities determined by the zoom level.

As mentioned above, FIG. 13 illustrates an example flow diagram of a series of acts 1300 for generating enhanced digital images by transforming raster-based elements in raster images to vector drawing segments. As shown, the series of acts 1300 includes an act 1310 of generating an edge map having a raster image of a raster element. In particular, the act 1310 involves generating an edge map including a plurality of edges of a raster element in a raster image.

In various embodiments, the act 1310 includes identifying a first portion of the raster image displayed within a graphical user interface and generating the edge map specific to the displayed first portion of the raster image. In additional embodiments, the act 1310 includes identifying a zoom operation that displays a second portion of the raster image at a different zoom level within the graphical user interface than the first portion, detecting a modified pixel density based on the different zoom level, and generating a second edge map of the raster image based on the modified pixel density.

The series of acts 1300 also includes an act 1320 of identifying a pixel of an edge in the edge map based on a user interaction in the raster image. In particular, the act 1320 can involve identifying a first pixel of a first edge of the plurality of edges of the edge map based on a user interaction with the raster image. In some embodiments, the act 1320 identifies the first pixel by mapping coordinates of the raster image based on the position of a cursor to the edge map.

In addition, the series of acts 1300 includes an act 1330 of generating a pixel line for the edge by stepping from the pixel through connecting pixels of the edge until a line termination condition is satisfied. Moreover, the act 1330 can involve generating a first pixel line for the first edge by stepping from the first pixel through a plurality of connecting pixels of the first edge until a line termination condition is satisfied as well as by prioritizing adjacent pixels relative to diagonal pixels and adding the first pixel and the plurality of connecting pixels to the first pixel line.

In one or more embodiments, the act 1330 includes prioritizing adjacent pixels over diagonal pixels by stepping from a first connecting pixel of the plurality of connecting pixels to a second connecting pixel of the plurality of connecting pixels; detecting an adjacent pixel of the second connecting pixel and a diagonal pixel of the second connecting pixel; and stepping to the adjacent pixel from the second connecting pixel rather than stepping from the second connecting pixel to the diagonal pixel. In some embodiments, the act 1330 includes stepping from the first pixel to a first connecting pixel of the plurality of connecting pixels and stepping from the first connecting pixel to a second connecting pixel of the plurality of connecting pixels by disregarding one or more pixels of the first edge adjacent to the first pixel.

In one or more embodiments, the act 1330 includes detecting the line termination condition by detecting a repeat pixel corresponding to the plurality of connecting pixels, based on the number of pixels within the pixel line exceeding a pixel-per-line amount, or by identifying a pixel split from a connecting pixel of the first pixel line. In additional embodiments, the act 1330 includes detecting the pixel split by identifying three adjacent pixels or three diagonal pixels for the connecting pixel of the first pixel line. In various embodiments, the act 1330 includes adding the first pixel and the plurality of connecting pixels to the first pixel line by storing a plurality of edge map coordinates indicating locations of the first pixel and the plurality of connecting pixels.

In some embodiments, the act 1330 includes stepping in a first direction from the first pixel through the plurality of connecting pixels. Further, in various embodiments, the act 1330 also includes generating the first pixel line for the first edge by (while disregarding one or more pixels of the plurality of connecting pixels identified by stepping in the first direction) stepping from the first pixel in a second direction from the first pixel through a second plurality of connecting pixels of the first edge until a second line termination condition is satisfied and adding the second plurality of connecting pixels to the first pixel line such that the first pixel line includes the first pixel, the plurality of connecting pixels, and the second plurality of connecting pixels.

Further, the series of acts 1300 includes an act 1340 of identifying a cached matrix of Bézier coefficients. In particular, the act 1340 involves identifying a cached matrix of Bézier coefficients corresponding to a number of pixels in the pixel line. In one or more embodiments, the act 1340 includes generating the matrix of Bézier coefficients for a previous pixel line, where the previous pixel line includes the number of pixels, caching the matrix of Bézier coefficients, and identifying the cached matrix of Bézier coefficients based on the number of pixels in the pixel line being the same as the number of pixels of the previous pixel line.

In addition, the series of acts 1300 includes an act 1350 of generating a vector drawing segment by fitting a Bézier curve to the pixel line. In particular, the act 1350 involves generating an enhanced digital image including a vector drawing segment based on the raster image by fitting a Bézier curve to the first pixel line for the first edge. In alternative embodiments, the act 1350 can involve generating an enhanced digital image including a vector-based element by fitting a Bézier curve to the pixel line utilizing the cached matrix of Bézier coefficients.

In one or more embodiments, the act 1350 includes generating the enhanced digital image having the vector drawing segment by fitting the Bézier curve to the plurality of edge map coordinates of the first pixel line. In additional embodiments, the act 1350 includes fitting the Bézier curve to the first pixel line for the first edge by determining that one or more edge map coordinates of the plurality of edge map coordinates of the first pixel line exceed a distance threshold from the Bézier curve and dividing, based on determining that the one or more edge map coordinates exceed the distance threshold, the Bézier curve into multiple Bézier curves being fitted to the one or more edge map coordinates.

In various embodiments, the act 1350 includes fitting the Bézier curve to the pixel line for the edge by determining a corner pixel within the pixel line based on comparing groups of at least three connected pixels of the pixel line to determine that a curvature value exceeds a maximum curvature threshold and fitting a first Bézier curve between a first endpoint of the pixel line and the corner pixel and a second Bézier curve between a second endpoint of the pixel line and the corner pixel.

The term "digital environment," as used herein, generally refers to an environment implemented, for example, as a stand-alone application (e.g., a personal computer or mobile application running on a computing device), as an element of an application, as a plug-in for an application, as a library function or functions, as a computing device, and/or as a cloud-computing system. A digital medium environment allows the image transformation system to edit digital images, as described herein.

Embodiments of the present disclosure can include or utilize a special-purpose or general-purpose computer including computer hardware, such as, for example, one or more processors and system memory, as discussed in additional detail below. Embodiments within the scope of the present disclosure also include physical and other computer-readable media for carrying or storing computer-executable instructions and/or data structures. In particular, one or more of the processes described herein can be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media accessible by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can include at least two distinctly different kinds of computer-readable media: non-transitory computer-readable storage media (devices) and transmission media.

Non-transitory computer-readable storage media (devices) includes RAM, ROM, EEPROM, CD-ROM, solid-state drives, Flash memory, phase-change memory, other types of memory, other optical disk storage, magnetic disk storage or other magnetic storage devices, or any other medium used to store desired program code means in the form of computer-executable instructions or data structures, and accessible by a general-purpose or special-purpose computer.

Computer-executable instructions include, for example, instructions and data which, when executed by a processor, cause a general-purpose computer, special-purpose computer, or special-purpose processing device to perform a certain function or group of functions. In some embodiments, a general-purpose computer executes computer-executable instructions to turn the general-purpose computer into a special-purpose computer implementing elements of the disclosure. The computer-executable instructions can be, for example, binaries, intermediate format instructions such as assembly language, or even source code. Although the subject matter has been described in language specific to structural features and/or methods, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and the claims, a "cloud-computing environment" is an environment in which cloud computing is employed.

Figure 14:
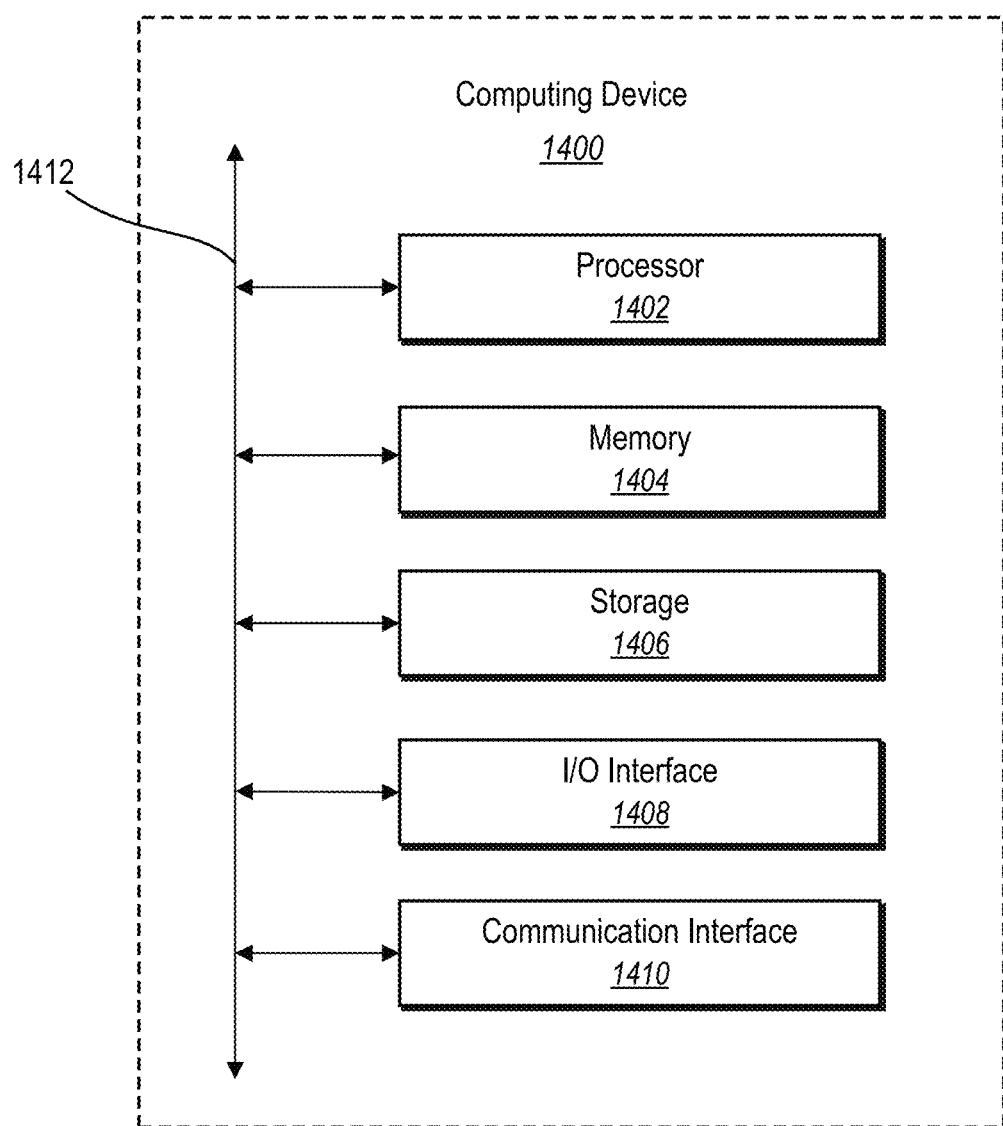
FIG. 14 illustrates a block diagram of an exemplary computing device for implementing one or more embodiments of the present disclosure.

FIG. 14 illustrates a block diagram of an exemplary computing device 1400 that can be configured to perform one or more of the processes described above. One will appreciate that one or more computing devices, such as the computing device 1400 can represent the client devices 200, 1102, server devices 1104, and computing device 1000 described above. In one or more embodiments, the computing device 1400 can be a mobile device (e.g., a mobile telephone, a smartphone, a PDA, a tablet, a laptop, a camera, a tracker, a watch, a wearable device, etc.). In some embodiments, the computing device 1400 can be a non-mobile device (e.g., a desktop computer or another type of client device). Further, the computing device 1400 can be a server device that includes cloud-based processing and storage capabilities.

As shown in FIG. 14, the computing device 1400 can include one or more processor(s) 1402, memory 1404, a storage device 1406, input/output ("I/O") interfaces 1408, and a communication interface 1410, which can be communicatively coupled by way of a communication infrastructure (e.g., bus 1412). While the computing device 1400 is shown in FIG. 14, the components illustrated in FIG. 14 are not intended to be limiting. Additional or alternative components can be used in other embodiments. Furthermore, in certain embodiments, the computing device 1400 includes fewer components than those shown in FIG. 14. Components of the computing device 1400 shown in FIG. 14 will now be described in additional detail.

In particular embodiments, the processor(s) 1402 includes hardware for executing instructions, such as those making up a computer program. As an example, and not by way of limitation, to execute instructions, the processor(s) 1402 can retrieve (or fetch) the instructions from an internal register, an internal cache, memory 1404, or a storage device 1406 and decode and execute them.

The computing device 1400 includes memory 1404, which is coupled to the processor(s) 1402. The memory 1404 can be used for storing data, metadata, and programs for execution by the processor(s). The memory 1404 can include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1404 can be internal or distributed memory.

The computing device 1400 includes a storage device 1406 includes storage for storing data or instructions. As an example, and not by way of limitation, the storage device 1406 can include a non-transitory storage medium described above. The storage device 1406 can include a hard disk drive (HDD), flash memory, a Universal Serial Bus (USB) drive or a combination these or other storage devices.

As shown, the computing device 1400 includes one or more I/O interfaces 1408, which are provided to allow a user to provide input to (such as user digital strokes), receive output from, and otherwise transfer data to and from the computing device 1400. These I/O interfaces 1408 can include a mouse, keypad or a keyboard, a touchscreen, camera, optical scanner, network interface, modem, other known I/O devices or a combination of such I/O interfaces 1408. The touchscreen can be activated with a stylus or a finger.

The I/O interfaces 1408 can include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1408 are configured to provide graphical data to a display for presentation to a user. The graphical data can be representative of one or more graphical user interfaces and/or any other graphical content as can serve a particular implementation.

The computing device 1400 can further include a communication interface 1410. The communication interface 1410 can include hardware, software, or both. The communication interface 1410 provides one or more interfaces for communication (such as, for example, packet-based communication) between the computing device and one or more other computing devices or one or more networks. As an example, and not by way of limitation, communication interface 1410 can include a network interface controller (NIC) or network adapter for communicating with an Ethernet or other wire-based network or a wireless NIC (WNIC) or wireless adapter for communicating with a wireless network, such as a WI-FI. The computing device 1400 can further include a bus 1412. The bus 1412 can include hardware, software, or both that connects components of computing device 1400 to each other.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention can be embodied in other specific forms without departing from its spirit or essential characteristics. The described embodiments are to be considered in all respects only as illustrative and not restrictive. For example, the methods described herein can be performed with fewer or more steps/acts or the steps/acts can be performed in differing orders. Additionally, the steps/acts described herein can be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A system for generating enhanced digital images by transforming raster-based elements in raster images to vector drawing segments comprising:
   at least one processor,
   a memory comprising a raster image comprising a raster element; and
   at least one non-transitory computer-readable medium storing instructions that, when executed by the at least one processor, cause the system to:
   generate an edge map by detecting a plurality of edges of the raster element in the raster image;
   identify a first edge of the plurality of edges of the raster element within the edge map based on a first user interaction within a graphical user interface displaying the raster image;
   generate, for display as a first overlay to the raster element in the raster image within the graphical user interface, a first pixel line corresponding to the first edge in response to the first user interaction;
   identify a second user interaction within the graphical user interface indicating a selection of the first pixel line; and
   provide, for display as a second overlay to the raster element in the raster image within the graphical user interface, a vector drawing segment fitted to the first pixel line in response to the second user interaction selecting the first pixel line.

2. The system of claim 1, further comprising instructions that cause the system to identify the first edge of the plurality of edges of the raster element within the edge map by:
   determining coordinates of the first user interaction within the graphical user interface displaying the graphical user interface; and
   mapping the coordinates of the first user interaction to the edge map to identify the first edge of the plurality of edges of the raster element within the edge map.

3. The system of claim 1, further comprising instructions that cause the system to highlight the first pixel line in the raster image in response to the first user interaction, wherein only a single pixel line is displayed over the raster element.

4. The system of claim 1, further comprising instructions that cause the system to delay fitting the vector drawing segment to the first pixel line until after detection of the second user interaction selecting the first pixel line.

5. The system of claim 1, further comprising instructions that cause the system to remove the first overlay comprising the first pixel line from the user interface prior to providing the second overlay comprising the vector drawing segment for display.

6. The system of claim 1, further comprising instructions that cause the system to:
   identify a third user interaction associated with the raster element in the raster image within the graphical user interface;
   identify a second edge of the plurality of edges of the raster element within the edge map based on the third user interaction; and
   generate, for display as a third overlay to the raster element in the raster image within the graphical user interface, a second pixel line corresponding to the second edge in response to the third user interaction.

7. The system of claim 6, further comprising instructions that cause the system to generate, for display as the third overlay to the raster element in the raster image within the graphical user interface, the second pixel line together with the vector drawing segment over the raster image.

8. The system of claim 6, further comprising instructions that cause the system to remove the second pixel line upon receiving the first user interaction and prior to providing the first pixel line.

9. The system of claim 6, further comprising instructions that cause the system to:
   identify a fourth user interaction within the graphical user interface selecting the second pixel line; and
   provide, for display as a fourth overlay to the raster element in the raster image within the graphical user interface, a second vector drawing segment fitted to the second pixel line in response to the fourth user interaction selecting the first pixel line, the second vector drawing segment being displayed together with the vector drawing segment.

10. The system of claim 9, further comprising instructions that cause the system to connect the vector drawing segment fitted to the first pixel line and the second vector drawing segment fitted to the second pixel line.

11. A non-transitory computer-readable medium storing instructions that, when executed by at least one processor, cause a computer system to:
    generate an edge map by detecting a plurality of edges within a raster image displayed on a graphical user interface;
    render, within the graphical user interface, a first pixel line as an overlay to a first edge of the plurality of edges in the raster image without generating a vector drawing segment corresponding to the first edge;
    generate, in response to detecting a user interaction selecting the first pixel line, a vector drawing segment fitted to the first pixel line; and
    render the vector drawing segment fitted to the first pixel line together with the raster image within the graphical user interface.

12. The non-transitory computer-readable medium of claim 11, further comprising instructions that cause the computer system to trim the vector drawing segment by:
    visually separating, within the graphical user interface, the vector drawing segment into two portions at a point along the vector drawing segment based on receiving a second user interaction comprising a selection of the point along the vector drawing segment;
    identifying, while the selection of the second user interaction is maintained, a first portion of the two portions to remove based on movement information corresponding to the second user interaction; and
    removing the first portion of the vector drawing segment based on identifying the first portion for removal and detecting an end of the selection.

13. The non-transitory computer-readable medium of claim 11, further comprising instructions that cause the computer system to:
    identify a zoom level of the raster image displayed on the graphical user interface;
    determine pixel densities for available pixels based on the zoom level of the raster image displayed on the graphical user interface; and
    generate the edge map based on the pixel densities for the available pixels determined based on the zoom level.

14. The non-transitory computer-readable medium of claim 11, further comprising instructions that cause the computer system to render, within the graphical user interface, the first pixel line based on an initial user interaction with a pixel of the first edge of the raster image.

15. The non-transitory computer-readable medium of claim 14, further comprising instructions that cause the computer system to remove the first pixel line from the graphical user interface upon detecting an additional user interaction.

16. In a digital medium environment for rendering vector-based graphics, a computer-implemented method of transforming raster-based elements to vector-based segments, the method comprising:
    identifying a raster image that portrays a raster element;
    identifying a first edge of a plurality of edges of the raster element based on a first user interaction within a graphical user interface displaying the raster image;
    generating, for display as a first overlay to the raster element in the raster image within the graphical user interface, a first pixel line corresponding to a continuous, non-intersecting portion of the first edge;
    identifying a second user interaction within the graphical user interface, the second user interaction indicating a selection of the first pixel line; and
    providing, for display as a second overlay to the raster element in the raster image within the graphical user interface, a vector drawing segment fitted to the first pixel line in response to the second user interaction selecting the first pixel line.

17. The method of claim 16, further comprising:

highlighting the first pixel line in the raster image in response to the first user interaction, wherein the first pixel line corresponds to an edge of the raster element in the raster image, and wherein only a single pixel line is displayed over the corresponding edge of the raster element; and removing the highlighting of the first pixel line based on detecting an additional user interaction away from the corresponding edge of the raster element in the raster image.

18. The method of claim 16, further comprising delaying fitting the vector drawing segment to the first pixel line until after detection of the second user interaction selecting the first pixel line.

19. The method of claim 16, further comprising generating an edge map by detecting the plurality of edges of the raster element in the raster image; and wherein:

the edge map comprises a plurality of detected edges corresponding to the plurality of edges of the raster element in the raster image;

a resolution of the edge map matches an image resolution of the raster image; and identifying the first edge is further based on the edge map.

20. The method of claim 19, further comprising:

identifying a third user interaction associated with the raster element in the raster image within the graphical user interface;

identifying a second edge of the plurality of edges of the raster element based on the third user interaction within the graphical user interface displaying the raster image; and generating, for display as a third overlay over the raster image, a second pixel line corresponding to the second edge in response to the third user interaction, the third overlay being displayed with the second overlay that comprises the vector drawing segment.

* * * * *